United States Patent
Deshpande et al.

(10) Patent No.: US 8,948,749 B2
(45) Date of Patent: Feb. 3, 2015

(54) SYSTEM AND METHOD TO FACILITATE ACQUISITION OF ACCESS POINT BASE STATIONS

(75) Inventors: Manoj M. Deshpande, San Diego, CA (US); Srinivasan Balasubramanian, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 686 days.

(21) Appl. No.: 12/248,660

(22) Filed: Oct. 9, 2008

(65) Prior Publication Data

US 2009/0098872 A1    Apr. 16, 2009

Related U.S. Application Data

(60) Provisional application No. 60/979,796, filed on Oct. 12, 2007.

(51) Int. Cl.
   *H04W 48/18*    (2009.01)
   *H04W 8/18*     (2009.01)
   *H04J 11/00*    (2006.01)
   *H04W 48/08*    (2009.01)
   *H04W 84/04*    (2009.01)

(52) U.S. Cl.
   CPC .......... *H04W 48/18* (2013.01); *H04J 11/0093* (2013.01); *H04W 48/08* (2013.01); *H04W 84/045* (2013.01)
   USPC ...................... 455/432.3; 370/328; 455/435.2

(58) Field of Classification Search
   USPC ..................................................... 455/435.2
   See application file for complete search history.

(56) References Cited

U.S. PATENT DOCUMENTS

| | | | |
|---|---|---|---|
| 6,405,038 B1 * | 6/2002 | Barber et al. ................. | 455/434 |
| 7,489,913 B2 * | 2/2009 | Welnick et al. ............... | 455/140 |
| 7,593,730 B2 | 9/2009 | Khandelwal et al. | |
| 7,630,711 B2 * | 12/2009 | Nagaraj et al. ............. | 455/432.1 |
| 7,809,369 B2 * | 10/2010 | Parmar et al. ............. | 455/432.1 |
| 2003/0148786 A1 | 8/2003 | Cooper et al. | |

(Continued)

FOREIGN PATENT DOCUMENTS

| | | |
|---|---|---|
| CN | 1640180 | 7/2005 |
| CN | 101043440 A | 9/2007 |

(Continued)

OTHER PUBLICATIONS

International Search Report & Written Opinion—PCT/US2009/079588, International Search Authority—European Patent Office—Feb. 24, 2009.

(Continued)

*Primary Examiner* — Vladimir Magloire
*Assistant Examiner* — Natasha Cosme

(57) ABSTRACT

Devices and methods are provided for facilitating selection and acquisition of an access point (AP) base station via implementation of a system selection file that may include a preferred roaming list (PRL), a public land mobile network (PLMN) database, or the like. The selection attempts may be limited to specific preferred systems, such as, for example, the AP base station. The system selection file includes identification parameters of the preferred systems. In one embodiment, the identification parameters include at least one of a system identifier (SID) and a network identifier (NID) for a given one of the systems.

53 Claims, 16 Drawing Sheets

(56) References Cited

U.S. PATENT DOCUMENTS

| | | | |
|---|---|---|---|
| 2005/0064889 A1* | 3/2005 | Haumont | 455/514 |
| 2005/0070283 A1 | 3/2005 | Hashimoto et al. | |
| 2005/0227688 A1* | 10/2005 | Li et al. | 455/432.1 |
| 2006/0148433 A1 | 7/2006 | Welnick et al. | |
| 2007/0004404 A1* | 1/2007 | Buckley et al. | 455/434 |
| 2007/0097938 A1 | 5/2007 | Nylander et al. | |
| 2009/0052395 A1* | 2/2009 | Bao et al. | 370/331 |

FOREIGN PATENT DOCUMENTS

| | | |
|---|---|---|
| JP | H08307938 A | 11/1996 |
| JP | 2005109570 | 4/2005 |
| WO | WO9940746 | 8/1999 |

OTHER PUBLICATIONS

Taiwan Search Report—TW097139258—TIPO—Dec. 22, 2011.

* cited by examiner

SYSTEM AND METHOD TO FACILITATE ACQUISITION OF ACCESS POINT BASE STATIONS

CLAIM OF PRIORITY UNDER 35 U.S.C. §119

The present Application for patent claims priority to Provisional Application No. 60/979,796 entitled "SYSTEM AND METHOD TO FACILITATE ACQUISITION OF ACCESS POINT BASE STATIONS" filed Oct. 12, 2007, and assigned to the assignee hereof and hereby expressly incorporated by reference herein.

BACKGROUND

1. Field

The present application relates generally to wireless communications, and more specifically to systems and methods to enable associated access terminals to acquire an access point (AP) base station, while preventing other access terminals from attempting to acquire the AP base station.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance. These systems may include multiple-access systems capable of supporting communication with multiple users by sharing the available system resources. Examples of such multiple-access systems include Code Division Multiple Access (CDMA) systems, Time Division Multiple Access (TDMA) systems, and Frequency Division Multiple Access (FDMA) systems. A CDMA system may implement a radio access technology (RAT) such as cdma2000 or Wideband-CDMA (W-CDMA). cdma2000 covers the well-known IS-2000, IS-856, and IS-95 standards.

IS-2000 and IS-95 support both voice and data services and are commonly referred to as "1x-EV-DV", or simply "1x", where the DV stands for "data and voice". A wireless device (e.g., a cellular phone) supporting 1x typically maintains a preferred roaming list (PRL). The PRL contains information to assist the wireless device perform system selection and acquisition on 1x systems, particularly when the wireless device is roaming. The PRL identifies "permitted" systems that the wireless device should use and (optionally) "forbidden" systems that the wireless device should not use. The PRL format for 1x systems is described in a document TIA/EIA/IS-683-A, entitled "Over-the-Air Service Provisioning of Mobile Stations in Spread Spectrum Standards," June 1998, which is publicly available.

IS-856 supports packet data service and is commonly referred to as "1xEV-DO", where the DO stands for "data optimized". A wireless device supporting 1xEV-DO also maintains a PRL for system selection and acquisition on 1xEV-DO systems. The PRL format for 1xEV-DO is described in a document TIA/EIA/IS-683-C, entitled "Over-the-Air Service Provisioning of Mobile Stations in Spread Spectrum Standards," Oct. 25, 2002, which is also publicly available. IS-683-C describes (1) a PRL format that is an updated version of the PRL format defined by IS-683-A and that may be used for 1x systems and (2) an extended PRL format that may be used for both 1x and 1xEV-DO systems.

For 1x and 1xEV-DO, a wireless device maintains a PRL for system selection and acquisition. The wireless device may be programmed with the PRL via a serial interface, a Universal Serial Bus (USB) interface, or some other type of interface, e.g., during manufacturing or activation. The wireless device may also obtain the PRL via over-the-air signaling or from a Removable User Identity Module (R-UIM), which is a removable module that can be inserted into the wireless device. The wireless device may store the PRL in a non-volatile memory so that the PRL is retained even when power is turned off. The non-volatile memory may be located within the wireless device or in the removable module.

Such PRLs, whether pre-installed or deployed to wireless devices, include information that controls which base stations of the systems/networks the wireless devices may associate with. Base station (1x terminology) refers to a fixed station and may also be called a base transceiver station (BTS), an access point (1xEV-DO terminology), a Node B (W-CDMA terminology), or some other terminology. It is noted that a wireless device may also be called a mobile station (1x terminology), a user/access terminal or AT/HAT (1xEV-DO terminology), a user equipment (UE) (W-CDMA terminology), a mobile equipment (ME) (also W-CDMA terminology), a handset, a subscriber unit, or some other terminology.

Recently, a new class of small base stations has emerged, which may be installed in a user's home and provide indoor wireless coverage to mobile units using existing broadband Internet connections. Such a personal miniature base station is generally known as an access point (AP) base station, also referred to as Home Node B (HNB) unit, femto cell, femto base station (fBS), base station, or some other terminology. Typically, such AP base stations are connected to the Internet and the mobile operator's network via a digital subscriber line (DSL) router or cable modem, and allow for small scale network environments, also referred to as a femto network (i.e., a network of AP base stations or femto cells).

AP base stations allow for cellular access where coverage from normal base station support from a macro network (i.e., a network of non-femto cells) is weak or unavailable (e.g., indoors, remote locations, and the like). AP base stations may be described as small base stations that connect to wireless service providers via a broadband backhaul link, such as digital subscriber line (DSL), cable internet access, T1/T3, etc., and offer typical base station functionality, such as base transceiver station (BTS) technology, radio network controller, and gateway support node services. This allows a wireless device, referred to herein as an access terminal (AT), to connect to the AP base stations and utilize the wireless service. It is noted that ATs can include, for example, cellular phones, smart phones, laptops, handheld communication devices, handheld computing devices, satellite radios, navigational devices, PDAs, and/or any other suitable device for communicating over a wireless communication system.

An owner of an AP base station will typically limit access to his/her AP base station to those ATs associated with the AP base station, such as, for example, his/her AT and those ATs that he/she has specifically granted access to. Sometimes, a visitor AT (i.e., an AT that is not associated with any AP base stations, or an AT that is not currently in the coverage area of its associated AP base station) may enter the coverage area of a given AP base station it is not associated with. In certain situations, the visitor AT may repeatedly make attempts to acquire the AP base station despite the fact that it is not authorized to operate on the AP base station. Accordingly, there is a need for a technique for programming or adapting the AT to attempt acquisition of AP base stations that it is authorized to use, while refraining from attempting acquisition of other AP base stations that it is not authorized to use.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating selection and acquisition of access point (AP) base stations via implementation of a system selection file configured for efficient femto system selection. The system selection file may include a preferred roaming list (PRL), a public land mobile network (PLMN) database, an overlay algorithm configured to select at least one of a PRL and a PLMN database.

It is noted that one goal for the use of a system selection file is to allow a home femto cell user to succinctly list the home femto cell as the preferred femto cell and avoid other alien femto cells that, for example, may have the same system identifier (SID) but have a different network identifier (NID). With existing system selection files, such as, for example, PRLs, the PREF_ONLY flag/field is a global flag that indicates that the AT is allowed to camp only on systems that are defined in the PRL. Because the PREF_ONLY flag is scoped to the entire PRL, typical PRL configurations avoid setting this flag as operators, take the conservative approach, and typically allow the AT to camp on a system not listed in the PRL when the AT is not able to find any system listed in the PRL. To permit the desired flexibility in setting which subset of the systems listed in the PRL are to be selected and acquired, the PRL would have to list every alien femto cell in the PRL as a negative system (e.g., by setting the PREF_NEG field to '0') to avoid registrations attempts with the alien femto cells. In contrast, the present technique involves identifying preferred systems with local flags that apply to a subset or one of the systems listed in the system selection file.

In one approach, the method for selection of the preferred AP base station involves receiving a system selection file that includes preference parameters and acquisition parameters for a plurality of permitted communication systems. The systems may include at least one AP base station or femto cell. For example, the systems may include one or more AP base stations for a femto network and one or more macro base stations for a macro network.

In one example, the system selection file (e.g., a PRL) may include a system table, which in turn may include identification parameters of the permitted systems The identification parameters may include one or more SIDs and/or one or more NIDs. Each 3GPP2 1xRTT system in the system table may be keyed by a SID/NID pair or a Mobile Country Code/Mobile Network Code (MCC/MNC) pair. Each 2GPP2 EV-DO system in the system table may be identified using a subnet-ID.

The system table may include the preference parameters for the systems. Each entry in the system table may include a PREF_ONLY field for a given system. The system selection file may include an acquisition table, which in turn may include an indexed list of frequencies for acquisition of the systems. Each system table entry may include an acquisition index that refers to at least one the frequencies listed in the acquisition table.

According to related aspects, the method may involve, in response to a given one of the preference parameters being set to identify a given AP base station as a preferred system, utilizing a corresponding acquisition parameter to attempt acquisition of the given AP base station. The method involves or refraining from attempting acquisition of non-preferred systems and/or systems other than the given AP base station, which in turn facilitates avoiding making repeated attempts to acquire those AP base stations that a given access terminal (AT) is not authorized to operate on. The method may further involve, in response to failing to acquire the preferred system, selecting and acquiring another preferred system.

According to further related aspects, there is provided an apparatus with a receiver or the like adapted to receive a system selection file that includes preference parameters and acquisition parameters for a plurality of communication systems (e.g., including femto and macro cells). The apparatus may comprise at least one processor or the like for utilizing, in response to a given one of the preference parameters being set to identify a given AP base station as a preferred system, a corresponding acquisition parameter to attempt acquisition of the given AP base station.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 10 provides a block diagram of an exemplary AT.

DETAILED DESCRIPTION

Figure 1A:
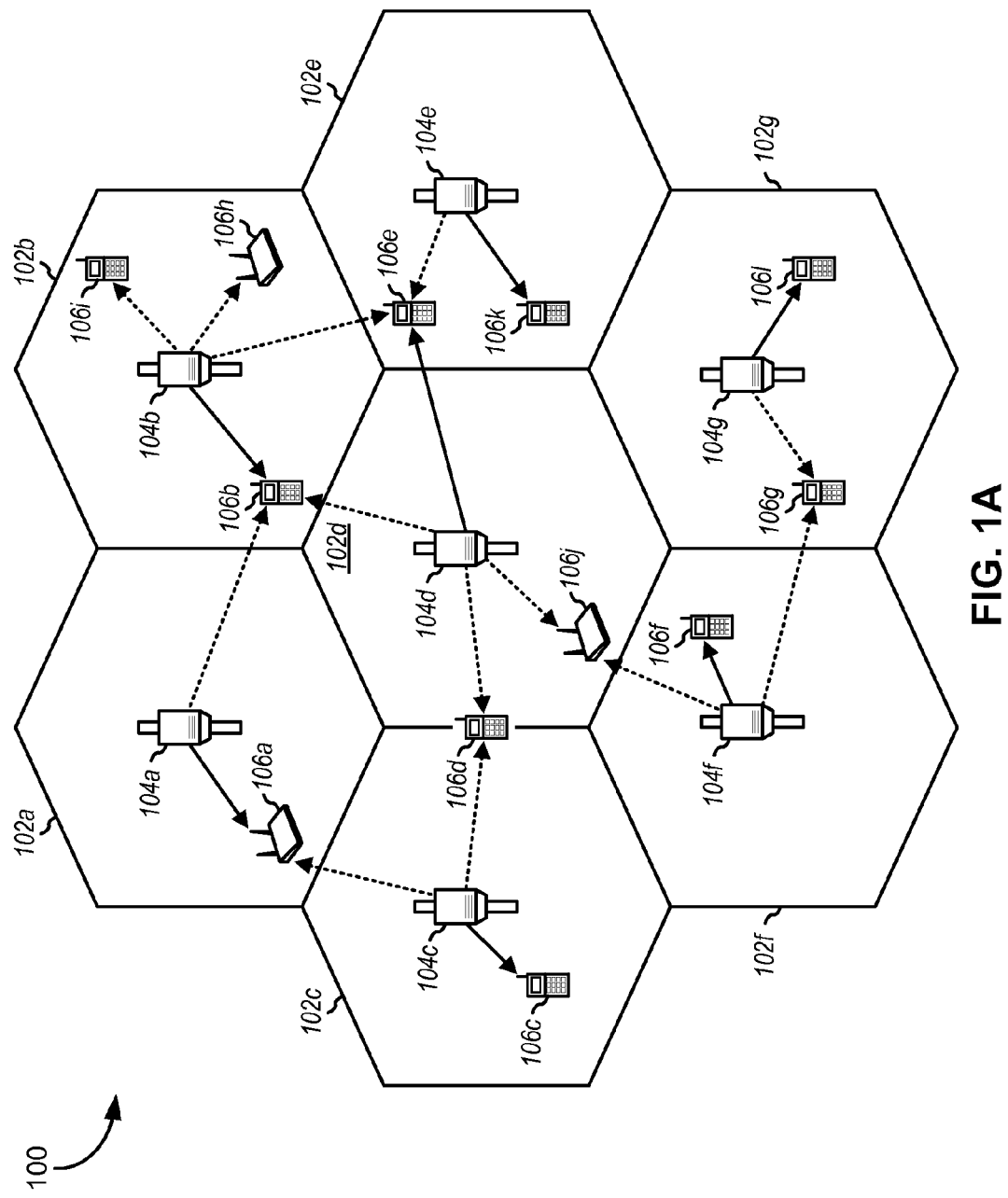
FIG. 1 Å illustrates an exemplary wireless communication system.
FIG. 1B shows two CDMA networks.
FIG. 1C shows a PRL structure used by IS-683-A and IS-683-C.
FIG. 1D shows a file containing a PRL defined by IS-683-A.
FIG. 1E shows a file containing an extended PRL defined by IS-683-C.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

FIG. 1A illustrates an exemplary wireless communication system 100 configured to support a number of users, in which various disclosed embodiments and aspects may be implemented. As shown in FIG. 1, by way of example, system 100 provides communication for multiple cells 102, such as, for example, macro cells 102a-102g, with each cell being serviced by a corresponding access point (AP) 104 (such as APs 104a-104g). Each cell may be further divided into one or more sectors. Various access terminals (ATs) 106, including ATs 106a-106k, also known interchangeably as user equipment (UE), are dispersed throughout the system. Each AT 106 may communicate with one or more APs 104 on a forward link (FL) and/or a reverse link (RL) at a given moment, depending upon whether the AT is active and whether it is in soft handoff, for example. The wireless communication system 100 may provide service over a large geographic region, for example, macro cells 102a-102g may cover a few blocks in a neighborhood.

Figure 1B:
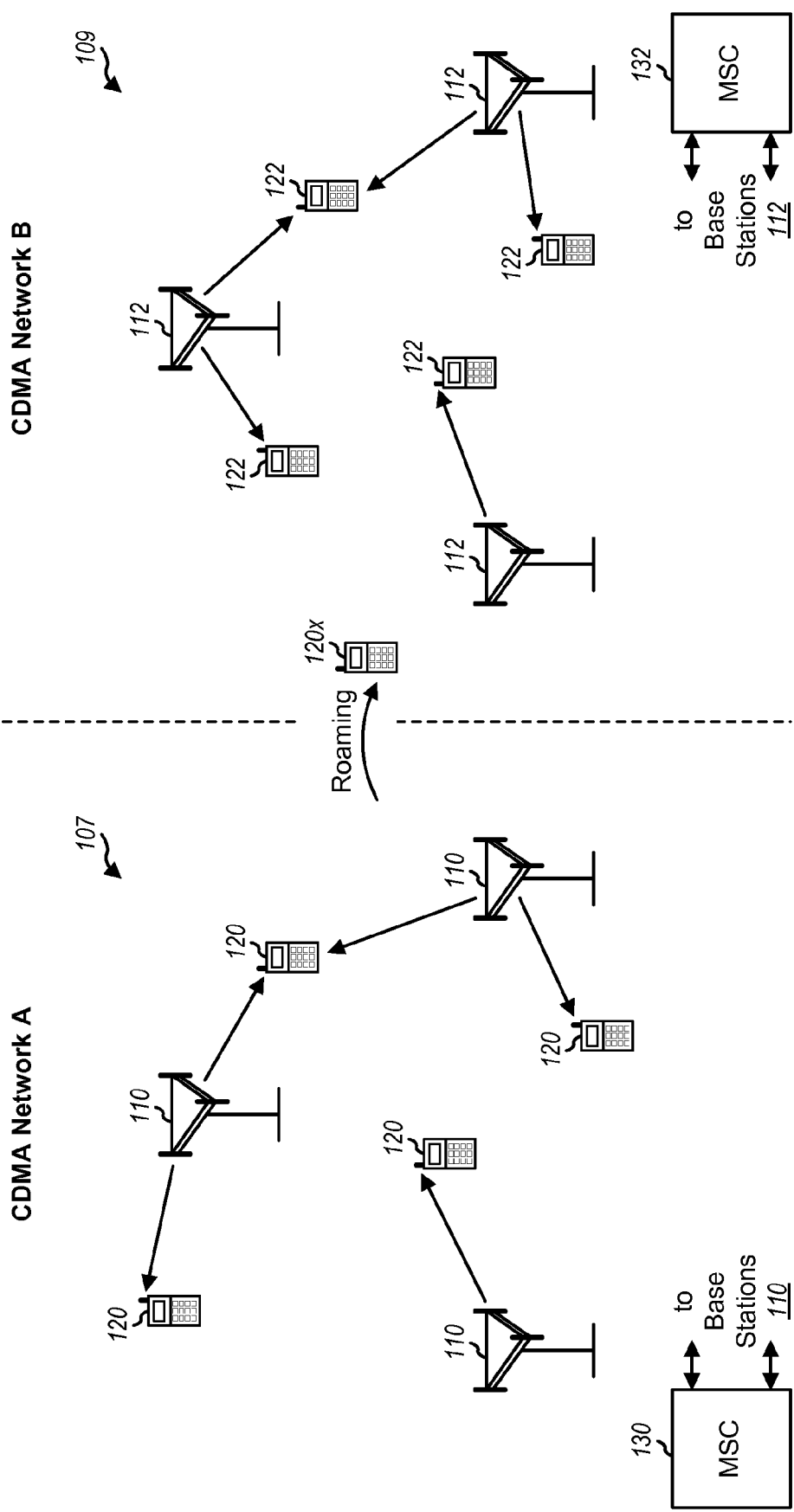

Referring now to FIG. 1B, there is shown two CDMA networks 107 and 109 that may be deployed in the same or different geographic regions. Each CDMA network may be a 1x network, a 1xEV-DO network, or some other types of network. Each CDMA network includes one or more systems, and each system further includes one or more smaller networks. Each system of a 1x network is identified by a system identification (SID) value, and each smaller network of each 1x system is identified by a network identification (NID) value. The systems and networks in 1xEV-DO are identified using a subnet-ID, which may be up to 128 bit long and follow IPv6 representation format as described in RFC2460, entitled "Internet Protocol, Version 6 (IPv6) Specification," December 1998. CDMA networks 107 and 109 typically include many base stations 110 and 112, respectively, that support communication for wireless devices 120 and 122, respectively, within the coverage areas of these CDMA networks. For simplicity, only three base stations are shown in FIG. 1B for each CDMA network. Wireless devices 120 and 122 are located throughout the coverage areas of CDMA networks 107 and 109, respectively. Mobile switching centers (MSCs) 130 and 132 provide coordination and control for base stations in CDMA networks 107 and 109, respectively.

Figure 1C:
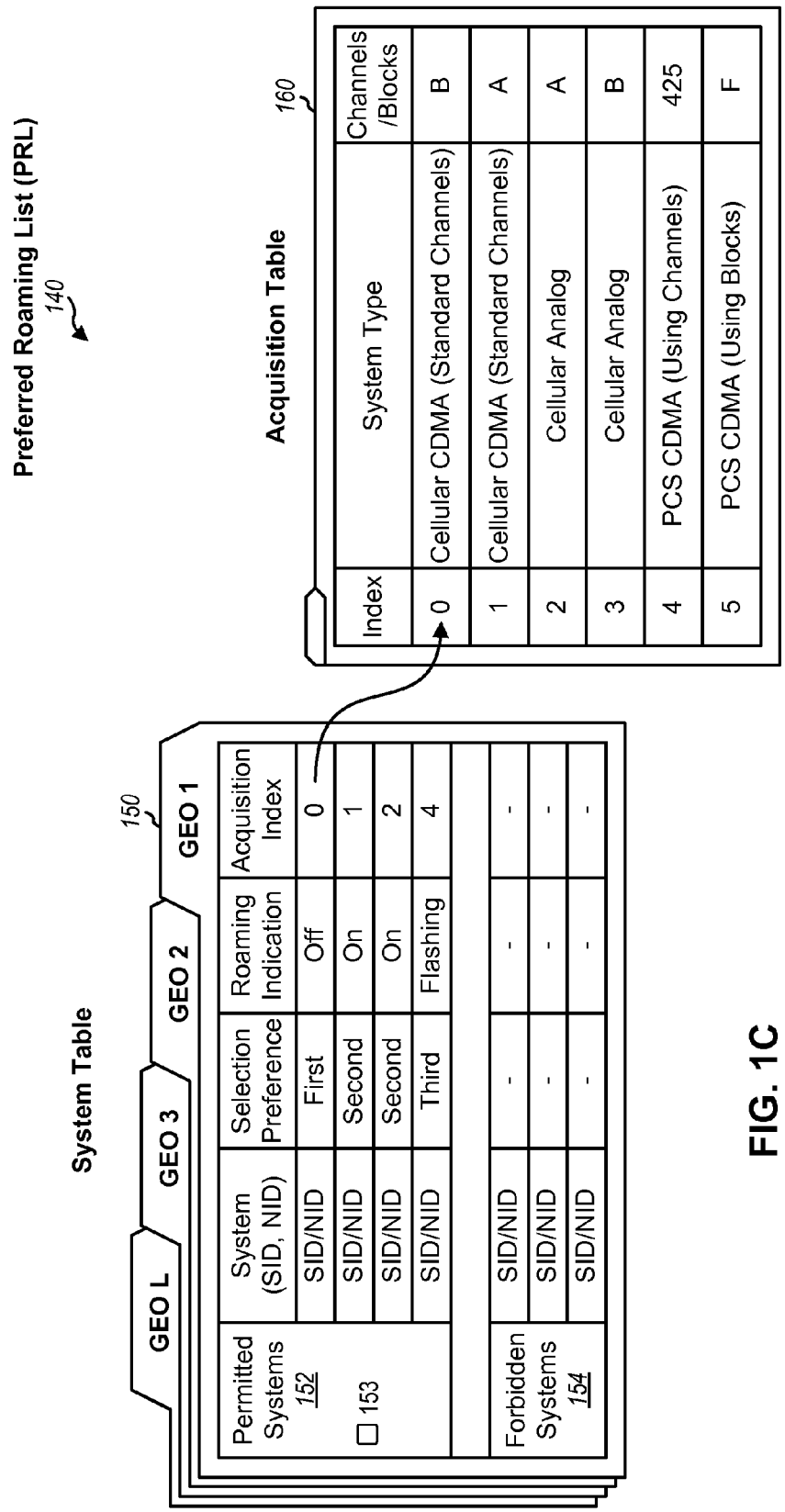

FIG. 1C graphically shows a preferred roaming list (PRL) 140 having the structure used by IS-683-A and IS-683-C. PRL 140 includes a system table 150 and an acquisition table 160. System table 150 includes a list of permitted and forbidden systems/networks, which is organized by geographic areas, such as via geographical region indicators (GEOs). For clarity, FIG. 1C shows each geographic area being represented by a respective tabbed table. Each tabbed table includes a section 152 for preferred systems/networks that the wireless device should access and a section 154 for forbidden systems/networks that the wireless device should not access. Each tabbed table also includes a global flag 153 (e.g., PREF_ONLY field/tag) that applies to the entire PRL 140.

System table 150 and acquisition table 160 have different formats for 1x and 1xEV-DO. FIG. 1C shows the PRL format used for 1x. The tabbed table for each geographic area includes (1) one or more records for one or more systems/networks in the geographic area and (2) multiple fields for pertinent information for each record. These fields include system fields, a selection preference field, a roaming indicator field, and an acquisition index field. For each record, the system fields store the (SID, NID) pair assigned to the system/network associated with that record. The selection preference field indicates the preference for the associated system/network among all of the permitted systems/networks within the same geographic area. The network operator typically specifies the preference. The roaming indication field specifies how a roaming indicator on the wireless device should be displayed when receiving a signal from the associated system/network. The acquisition index field stores an index value that points to a specific record in acquisition table 160 containing the parameters to use to acquire the associated system/network. Acquisition table 160 includes one record for each unique index value. Each acquisition record includes multiple fields for various parameters used for system acquisition. The acquisition records for different types of system have different formats.

FIG. 1C shows a graphical representation of a PRL used for 1x. A PRL used for 1xEV-DO has a different format, as described below. For both 1x and 1xEV-DO, the PRL information is typically stored as a file.

Figure 1D:
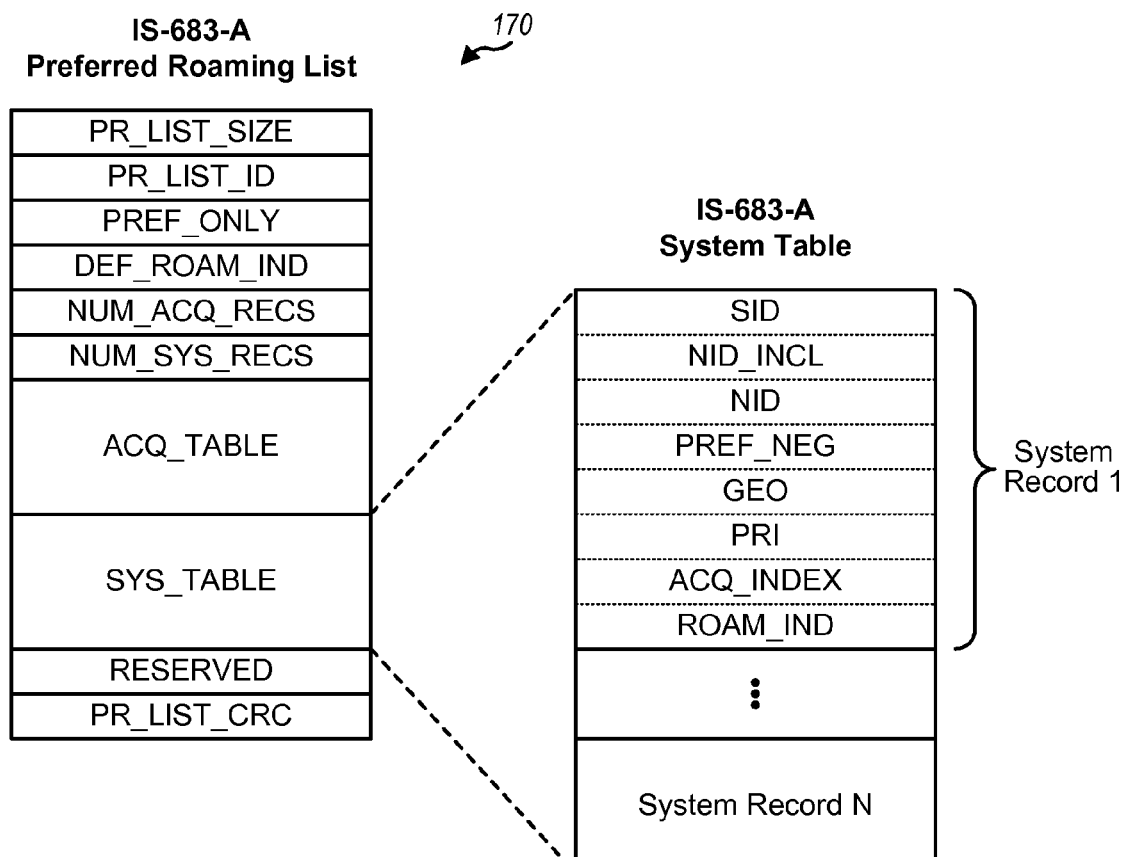

FIG. 1D shows a file 170 containing a PRL in the format defined by IS-683-A. The PRL contains a number of fields, which are shown in FIG. 1D. A PR_LIST_SIZE field indicates the total size of the PRL (in octets or bytes). A NUM_ACQ_RECS field indicates the number of records in the acquisition table (i.e., acquisition records). A NUM_SYS_RECS field indicates the number of records in the system table (i.e., system records). An ACQ_TABLE field contains all of the records for acquisition table 160. A SYS_TABLE field contains all of the records for system table 150. A PR_LIST_CRC field carries a 16-bit CRC value that is calculated for all fields of the PRL except for the PR_LIST_CRC field. The other fields of the PRL are described in the IS-683-A document.

FIG. 1D also shows the format of a system record, as defined by IS-683-A. A SID field contains the SID value for the system associated with the record. A NID_INCL field indicates whether the record includes a NID. A NID field (if present) contains the NID value for the network associated with the record. An ACQ_INDEX field contains an index for an acquisition record containing acquisition parameters for the associated system. The other fields of the system record are described in the IS-683-A document.

IS-683-C defines two PRL formats—a PRL format and an extended PRL format. The PRL format in IS-683-C is similar to the PRL format in IS-683-A and may be used to convey PRL information for 1x systems. The extended PRL format in IS-683-C is different from the PRL format in IS-683-A and may be used to convey PRL information for both 1x and 1xEV-DO systems.

Figure 1E:
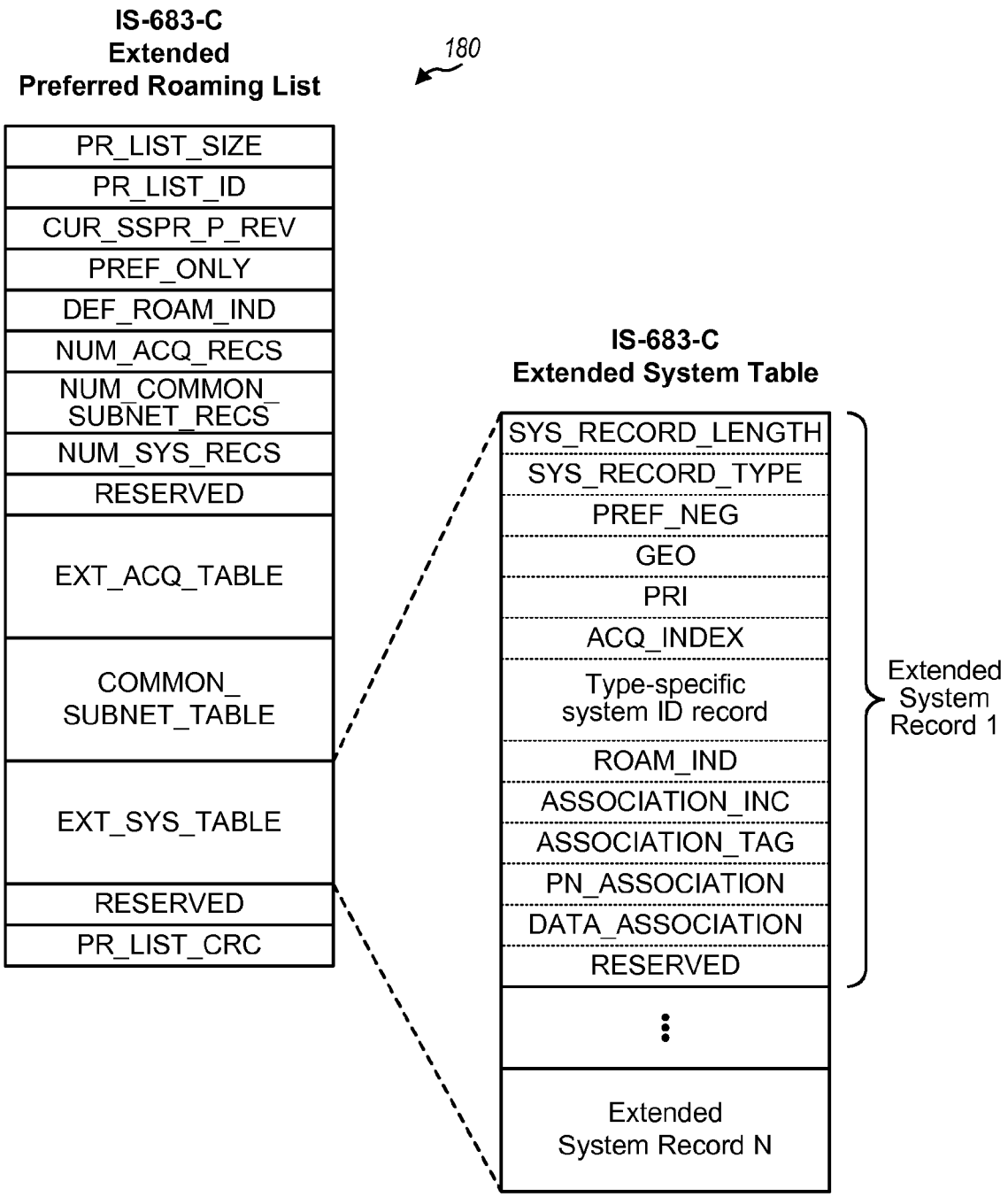

FIG. 1E shows a file 180 containing an extended PRL in the format defined by IS-683-C. The extended PRL contains a number of fields, which are shown in FIG. 1E. A PR_LIST_SIZE field indicates the total size of the extended PRL. A CUR_SSPR_P_REV field indicates the protocol revision of a System Selection for Preferred Roaming (SSPR) download procedure that determines the parsing rules for the PRL. A NUM_ACQ_RECS field indicates the number of records in an extended acquisition table (i.e., extended acquisition records). A NUM_SYS_RECS field indicates the number of records in an extended system table (i.e., extended system records). A NUM_COMMON_SUBNET_RECS field indicates the number of records in a common subnet table. This common subnet table contains common portions of subnet- IDs. PRL compression may be achieved by listing common subnet prefixes only once in the common subnet table instead of many times in the system table. An EXT_ACQ_TABLE field contains all of the records for the extended acquisition table. A COMMON_SUBNET_TABLE field contains all of the records for the common subnet table. An EXT_SYS_TABLE field contains all of the records for the extended system table. A PR_LIST_CRC field carries a 16-bit CRC value that is calculated for all fields of the extended PRL except for the PR_LIST_CRC field. The other fields of the extended PRL are described in the IS-683-C document.

FIG. 1E also shows the format of an extended system record, as defined by IS-683-C. A SYS_RECORD_LENGTH field indicates the length of the extended system record. A SYS_RECORD_TYPE field indicates whether the record is for 1x or 1xEV-DO. A type-specific system ID record contains information that is specific for the system type indicated by the SYS_RECORD_TYPE field. For example, the system ID record contains SID and NID information for 1x and subnet information for 1xEV-DO. An ASSOCIATION_INC field indicates whether the system record contains an association tag. An ASSOCIATION_TAG field (if present) contains the association tag. Multiple systems within a given geographic area may be associated together and assigned an association tag that is unique for that geographic area. For example, 1x systems and 1xEV-DO systems within the same geographic area may be associated together. A wireless device may attempt to acquire a 1x system when first powered on, then determine a 1xEV-DO system associated with the acquired 1x system, and then attempt to acquire the associated 1xEV-DO system. The association allows the wireless device to more quickly acquire the 1xEV-DO system based on the 1x system. The other fields of the extended system record are described in the IS-683-C document.

In accordance with one or more aspects of the embodiments described herein, access point (AP) base stations can be deployed to individual consumers and placed in homes, apartment buildings, office buildings, and the like. An AP base station can communicate wirelessly with an AT in range of the AP base station utilizing a licensed cellular transmission band. Further, AP base stations may be connected to a core cellular network by way of an Internet Protocol (IP) connection, such as a Digital Subscriber Line (DSL, e.g., including Asymmetric DSL (ADSL), High data rate DSL (HDSL), Very high speed DSL (VDSL), etc.), a TV cable carrying Internet Protocol (IP) traffic, a Broadband over Power Line (BPL) connection, or like connection. The connection between the IP line and the cellular network can be a direct connection, or by way of the Internet. An AP base station, therefore, can provide cellular support to an AT or cellular handset and route cellular traffic (e.g., voice, data, video, audio, Internet, etc.) to a macro cellular network through the IP connection. This mechanism can save consumers air time costs and reduce a network provider's cellular network traffic load. Also, cellular coverage inside a home, office building, apartment, etc. can be greatly improved via implementation of AP base stations.

Figure 2:
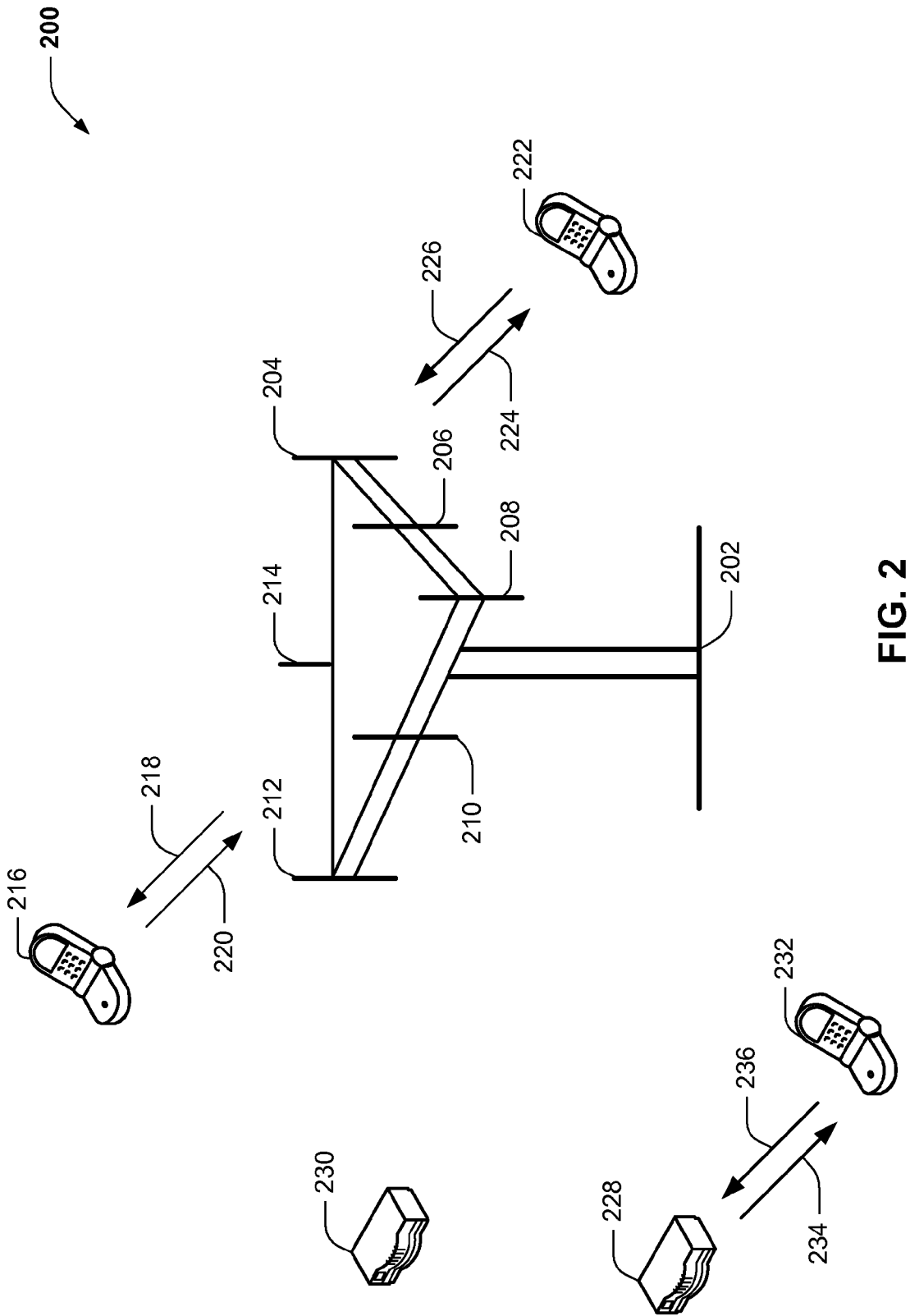
FIG. 2 is an illustration of a wireless communication system in accordance with one or more aspects set forth herein.

Referring now to FIG. 2, a wireless communication system 200 is illustrated in accordance with various embodiments presented herein. System 200 comprises a base station 202 that can include multiple antenna groups. For example, one antenna group can include antennas 204 and 206, another group can comprise antennas 208 and 210, and an additional group can include antennas 212 and 214. Two antennas are illustrated for each antenna group; however, more or fewer antennas can be utilized for each group. Base station 202 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Base station 202 can communicate with one or more ATs, such as, for example, AT 216 and AT 222.

As depicted in FIG. 2, AT 216 is in communication with antennas 212 and 214, where antennas 212 and 214 transmit information to AT 216 over a forward link 218 and receive information from AT 216 over a reverse link 220. Moreover, AT 222 is in communication with antennas 204 and 206, where antennas 204 and 206 transmit information to AT 222 over a forward link 224 and receive information from AT 222 over a reverse link 226. In a Frequency Division Duplex (FDD) system, forward link 218 can utilize a different frequency band than that used by reverse link 220, and forward link 224 can employ a different frequency band than that employed by reverse link 226, for example. Further, in a Time Division Duplex (TDD) system, forward link 218 and reverse link 220 can utilize a common frequency band and forward link 224 and reverse link 226 can utilize a common frequency band.

Each group of antennas and/or the area in which they are designated to communicate can be referred to as a sector of base station 202. For example, antenna groups can be designed to communicate to ATs in a sector of the areas covered by base station 202. In communication over forward links 218 and 224, the transmitting antennas of base station 202 can utilize beamforming to improve signal-to-noise ratio of forward links 218 and 224 for ATs 216 and 222. Also, while base station 202 utilizes beamforming to transmit to ATs 216 and 222 scattered randomly through an associated coverage, ATs in neighboring cells can be subject to less interference as compared to a base station transmitting through a single antenna to all its ATs. Moreover, ATs 216 and 222 can communicate directly with one another using a peer-to-peer or ad hoc technology in one example.

Similar functionality of base station 202 can be implemented in AP base stations 228 and 230, which can be deployed in smaller scale locations, such as a residence or office building for example. As mentioned previously, AP base stations are also referred to as femto cells or Home Node B (HNB) units, and can have a broadband backhaul link to a wireless service provider, such as over DSL, cable, T1/T3, etc., and can provide wireless communication service to one or more ATs. As shown, AP base station 228 can communicate with one or more AT(s) 232 over a forward link 234 and receive communication from the AT(s) 232 over a reverse link 236 similarly to the base station 202.

According to an example, AP base station 230 can be deployed to provide wireless service access. AP base station 230 can connect to a wireless service access provider via broadband backhaul link, one or more disparate femto cells or macro cells over-the-air, etc. Upon being deployed, AP base station 230 can optionally self-configure to avoid interference with surrounding femto cells (e.g., AP base station 228) and macro cells (e.g., base station 202 or a sector/cell thereof). In this regard, AP base station 230 can receive signals from the base station 202 and disparate AP base station 228 much like ATs 216, 222, and 232. The signals can be overhead system messages that can be utilized by the AP base station 230 to determine configuration parameters utilized by the disparate AP base station 228 and/or base station 202.

The configuration parameters can be determined by AP base station 230 for similar environment configuration. In addition, the parameters can be determined and utilized to ensure AP base station 230 selects different parameters to mitigate interference. These parameters can include, for example, a channel identifier (e.g., a CDMA channel ID), a pseudo-noise (PN) offset, and/or the like, for AP base station 228, base station 202, and/or substantially any other surrounding transmitters. AP base station 230 can accordingly self-configure its channel identifier, PN offset, etc. so as not to interfere with the surrounding femto cells and macro cells. Additionally, AP base station 230 can utilize this information to build a neighbor list of surrounding femto cells and macro cells to facilitate hard and soft handoffs for devices communicating with AP base station 230. It is noted that AP base station 230 may be adapted to receive RF signals, for example, from AP base station 228 and/or base station 202 to determine timing, location, and/or the like.

Figure 3:
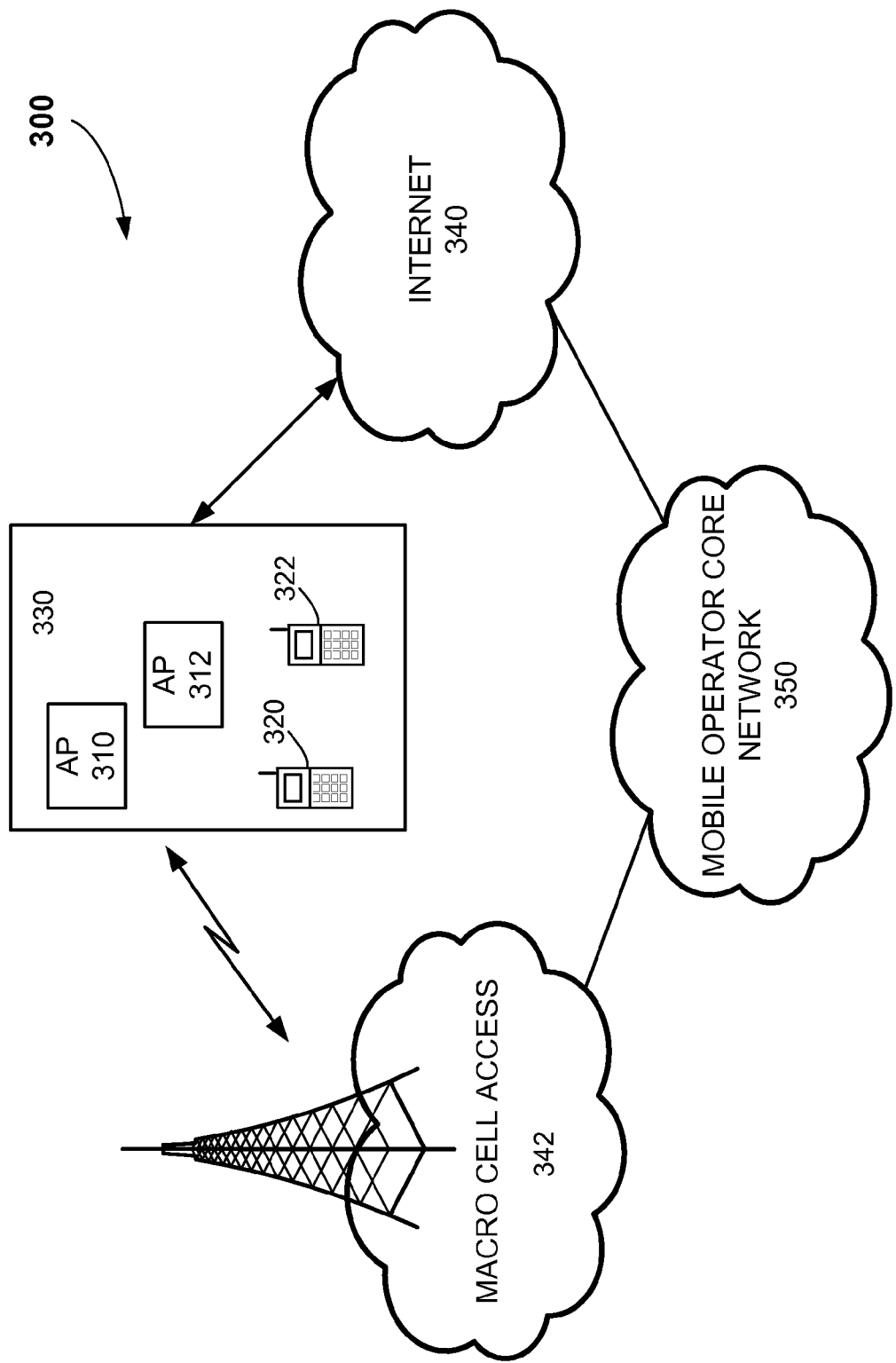
FIG. 3 illustrates an exemplary communication system to enable deployment of access point (AP) base stations within a network environment in accordance with the one or more aspects set forth herein.

FIG. 3 illustrates an exemplary communication system to enable deployment of AP base stations within a network environment. As shown in FIG. 3, the system 300 may include multiple AP base stations, such as, for example, AP base stations 310, 312 each being installed in a corresponding small scale network environment, such as, for example, in one or more user residences 330 or the like, and may be configured to serve an associated AT 320, as well as a non-associated AT 322. While the illustrative embodiment of FIG. 3 shows two AP base stations 310 and 312, it is noted that the system 300 may include any number of AP base stations. Further, while the present description focuses on AP base station 310, it is noted that the description is also applicable to AP base station 312 and other equivalents (not shown).

AP base station 310 may be further coupled to the Internet 340 and a macro network 350 (which also be referred to as a macro cell mobile network, a mobile operator core network, or variations thereof) via a DSL router, a cable modem, or the like. It is noted that, although certain embodiments described herein use 3GPP terminology, the embodiments may be applied to 3rd Generation Partnership Project (3GPP) (Rel99, Rel5, Rel6, Rel7) technology, as well as 3GPP2 (1xRTT, 1xEV-DO Rel0, RevA, RevB) technology, and other known and related technologies. In such embodiments described herein, the owner of AP base station 310 may subscribe to a mobile service, such as, for example, a 3G mobile service, offered through macro network 350.

AT 320 may adapted to operate both in a macro cellular environment (e.g., via macro cell access 342 operatively coupled to macro network 350) as well as in a residential small scale network environment (e.g., via AP base station 310 and/or 312). Thus, AP base station 310 may be backward compatible with any existing AT 320. In addition to macro network 350, AT 320 can be served by any number of AP base stations, predetermined or otherwise (e.g., AP base stations 310, 312 that reside within corresponding user residence 330), and generally will not be in a soft handover state with macro network 350.

If a macro AT that is not associated with AP base station 310, such as, for example, visitor AT 322, comes into the coverage area of AP base station 310, macro network 350 may direct the visitor AT 322 to another carrier frequency. However, the visitor AT 322 may at a subsequent time attempt acquisition of AP base station 310. For example, if a predetermined set of parameters, including identifiers such as, for example, a SID/NID pair and/or a Mobile Country Code/ Mobile Network Code (MCC/MNC) pair, are configured such that visitor AT 322 has to make an access attempt (e.g., perform a registration due to change in zone or subnet ID), this may result in repeated access attempts as visitor AT 322 enters the coverage area of AP base station 310.

In one embodiment, AT 322 receives or is otherwise provided with a system selection file configured for efficient AP base station selection. The system selection file may include preference parameters and acquisition parameters for a plurality of communication systems, wherein the systems comprise AP base station 310. The AT may comprise a memory unit adapted to store the system selection file, as well as a processor in operative communication with the memory unit. When the AT camps on a given system and the system selection file (e.g., a PRL) has a more preferred system listed in it in the same GEO, the AT will scan the channels associated with the more preferred system and camp on the more preferred system if the signal strength is strong enough (i.e., above the add threshold).

The processor being may be adapted to, in response to a given one of the preference parameters being set to identify AP base station 310 as a preferred system, utilize a corresponding acquisition parameter to attempt acquisition of the AP base station. The processor may be adapted to refrain from attempting acquisition of non-preferred systems and/or refrain from attempting acquisition of any systems other AP base station 310. Further details regarding the system selection file and associated techniques are provided below with reference to FIGS. 4-10.

Figure 4:
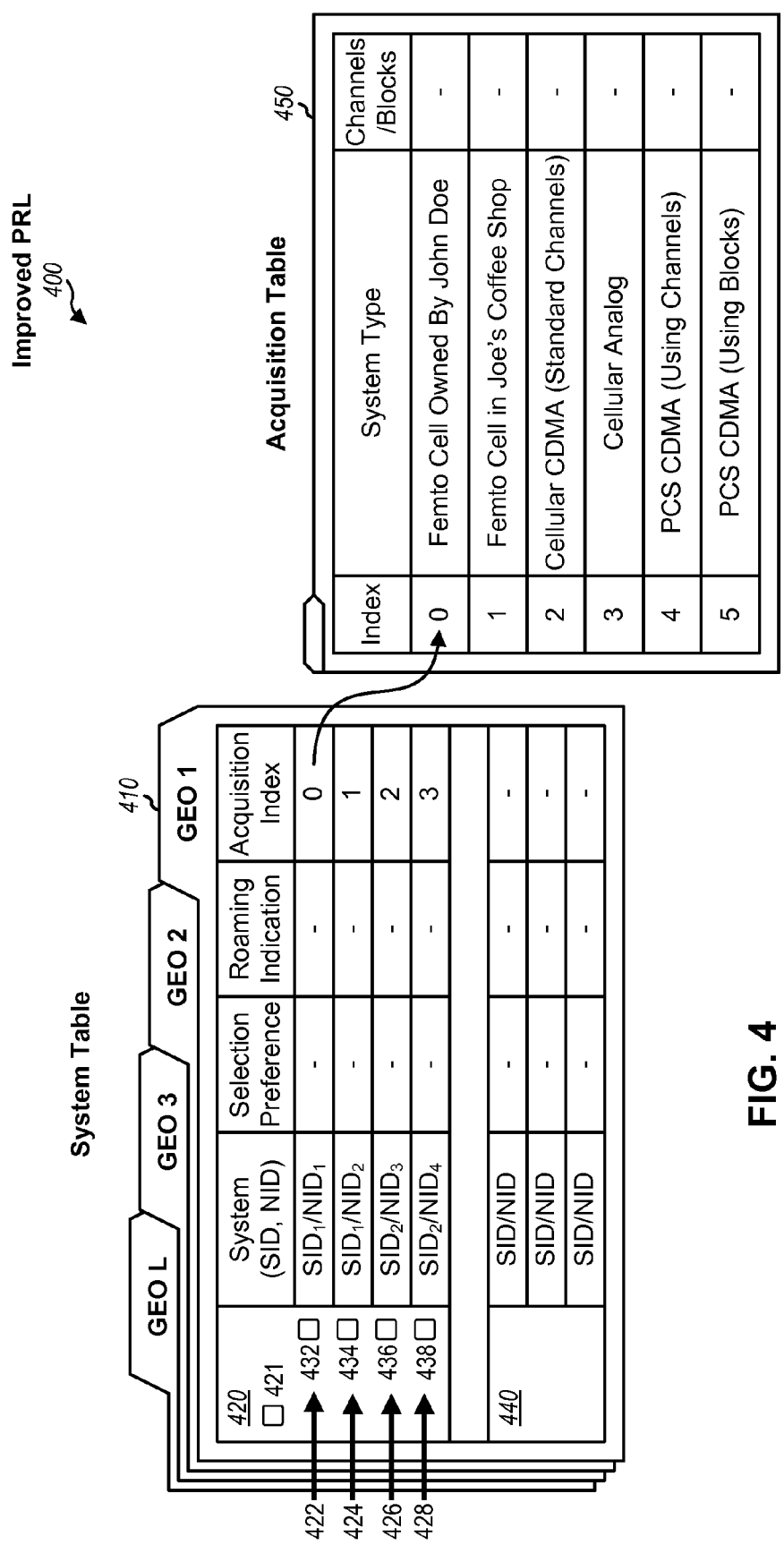
FIG. 4 illustrates one embodiment of a system selection file in accordance with aspects set forth herein.

In accordance with one or more aspects of the embodiments described herein, FIG. 4 graphically shows an embodiment of a system selection file 400 that includes a system table 410 and an acquisition table 450. Similar to PRL 140 shown in FIG. 1C, system table 410 of system selection file 400 may include a list of permitted systems/networks and (optionally) forbidden systems/networks organized by GEOs. As with system table 150 shown in FIG. 1C, system table 410 may represent each geographic area with a tabbed table, wherein each tabbed table may include a section 420 for preferred systems/networks that the wireless device should access and (optional) a section 440 for forbidden systems/ networks that the wireless device should not access. The system table may include a global flag 421 (e.g., PREF_ONLY) that applies to the entire PRL 140.

System table 410 of system selection file 400 may include permitted systems 422, 424, 426, 428, one or more of which may be identified by a SID/NID pair when the file 400 includes one or more 3GPP2 1xRTT systems. For example, system 422 may be identified by $SID_1/NID_1$, while system 424 may be identified by $SID_2/NID_2$. Similarly, system 426 may be identified by $SID_2/NID_3$, and system 426 may be identified by $SID_2/NID_4$. In the alternative, or in addition, one or more of the permitted systems 422, 424, 426, 428 may be identified by a MCC/MNC pair or the like. In the alternative, or in addition, one or more of the permitted systems 422, 424, 426, 428 may be identified by a subnet-ID when the file includes one or more 3GPP2 EV-DO systems.

System selection file 400 has one or more local flags (e.g., PREF_ONLY fields/tags) that apply to a subset of the systems/networks listed in system selection file 400, which is in contrast to PRL 140 in FIGS. 1C-E, which has a global flag 153 that applies to the entire PRL 140. For example, in the embodiment of FIG. 4, PREF_ONLY fields 432, 434, 436, and 438 apply to, or are otherwise associated with systems 422, 424, 426, and 428, respectively. It is noted that PREF_ONLY stands for the "Preferred only" and this field is set to '1' if the mobile station is to operate only on systems that are specified in SYS_TABLE (i.e., the system table) with PREF_NEG set to '1'. PREF_NEG stands for "Preferred/ negative system" and this field is set to '1' if the mobile station is allowed to operate on the system associated with this record. This field is set to '0' if the mobile station is not allowed to operate on the system associated with this record. It is noted that, in an alternative approach, a given authorized femto cell may be listed in the system selection file with its given SID/NID as the PREF system, and with all other unauthorized femto cells with their SID/NIDs as NEG systems. However, given the potentially large number of femto cells, such an approach may be impractical, and the resulting system selection file may be large and unwieldy. In a preferred approach, the system selection file lists one or a few permitted femto cells within the SID scope, and includes a PREF_ONLY flag for such listed femto cells. The other unspecified systems within the SID scope are automatically interpreted as NEG systems.

The PREF_ONLY field is set to '0' if the mobile station or AT is to operate on systems that are specified in SYS_TABLE with PREF_NEG set to '1' or on systems that are not specified in SYS_TABLE. Further details regarding PREF_ONLY are provided in "Over-the-Air Service Provisioning of Mobile Stations in Spread Spectrum Standards—Release C," Oct. 22, 2004, which is publicly available. It is noted that FIG. 4 shows a graphical representation of a system selection file that may be used for 1x. A PRL used for 1xEV-DO has a different format, as described below.

By having PREF_ONLY field 432 apply only to system 422, when this field is set to '1', the AT with system selection file 400 operates only on the system/network identified by the $SID_1/NID_1$ pair with PREF_NEG set to '1'. When PREF_ONLY field 432 is set to '0', then the AT may operate: (a) on the system/network identified by the $SID_1/NID_1$ pair with PREF_NEG set to '1'; (b) on any other system/network identified by the $SID_1$ and any arbitrary NID; or (c) on systems/networks that are not specified in SYS_TABLE. The $SID_1/NID_1$ pair may correspond to a femto cell owned by the individual (e.g., John Doe in FIG. 4) The scope of the new PREF_ONLY flag 432 is only $SID_1$. For other systems, such as $SID_2$, the selection is either governed by a PREF_ONLY flag for $SID_2$ if specified (e.g., PREF_ONLY flag 426) or by a glbal PREF_ONLY flag that applies to the entire system selection file (e.g., global PREF_ONLY flag 421). Similarly, selection of systems that are not listed in system selection file is governed by the global PREF_ONLY flag 421 that applies to the entire system selection file. The global PREF_ONLY flag 421 is a system selection file wide flag, and is example of a global flag/field.

Similarly, by having PREF_ONLY field 434 apply only to system 424, when this field is set to '1', the AT with system selection file 400 operates only on the system/network identified by the $SID_2/NID_2$ pair with PREF_NEG set to '1'. When PREF_ONLY field 432 is set to '0', then the AT may operate: (a) on the system/network identified by the $SID_2/NID_2$ pair with PREF_NEG set to '1'; (b) on any other system/network identified by the SID1 and any arbitrary NID; or (c) on systems/networks that are not specified in SYS_TABLE. If the global PREF_ONLY flag is not set, then AT can select those system as well when local PREF_ONLY flag is not set. The $SID_1/NID_2$ pair may correspond to a femto cell located in public venue, such as a coffee shop, library, mall, etc. (e.g., Joe's Coffee Shop in FIG. 4). In another example, the $SID_2/NID_3$ pair may correspond to standard channels of a given cellular CDMA system or the like.

Figure 5:
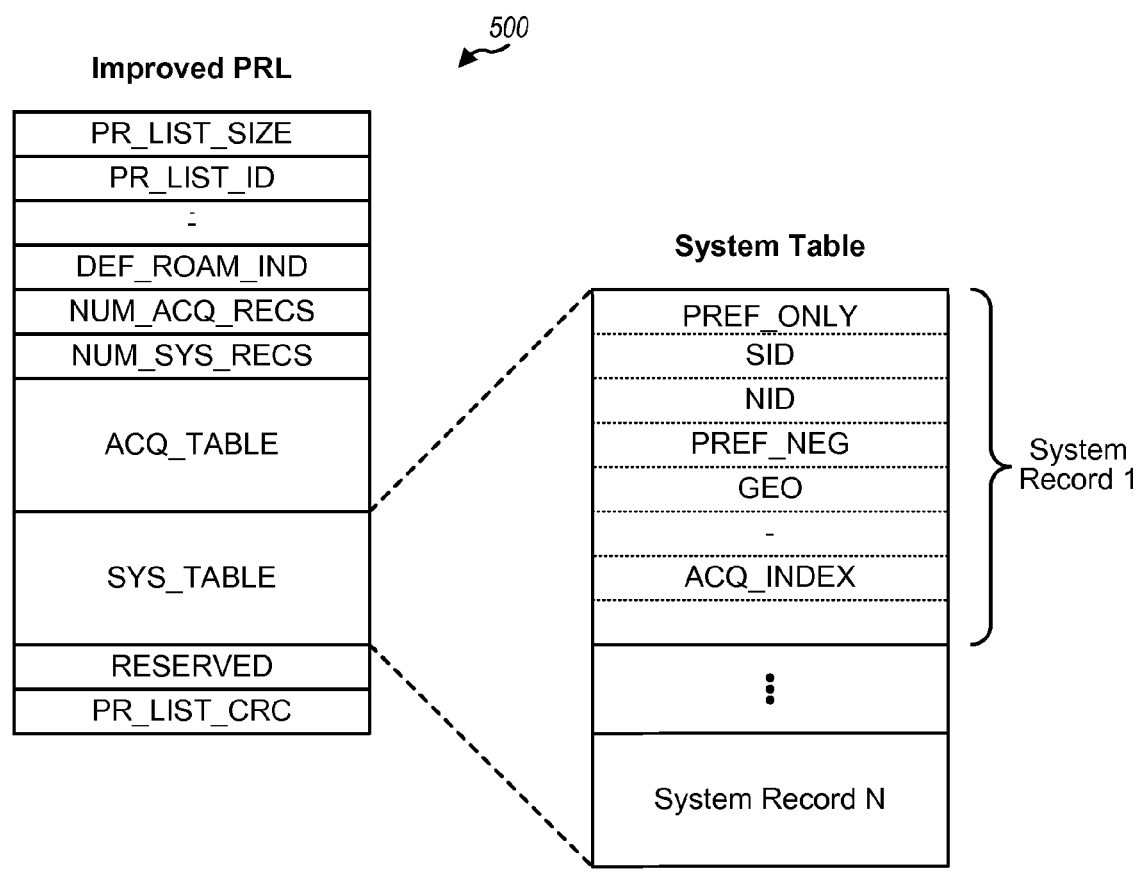
FIG. 5 shows an exemplary file containing a system selection file.

With reference to FIG. 5, there is provided a file 500 containing a system selection file that may be used for 1x, and that contains a number of fields that are the same as file 170 in FIG. 1D, such as, for example, an ACQ_TABLE (i.e., acquisition table) field and a SYS_TABLE field. The format of the system records are analogous to those of FIG. 1D, and may include, for example, a SID field, a NID_INCL field, an ACQ_INDEX field, etc. In contrast to file 170, however, the system record for a given system in file 500 may include a PREF_ONLY field that is specific to the given system. For example, with reference once again to FIG. 4, system selection file 400 includes PREF_ONLY field 432 for permitted system 422, PREF_ONLY field 434 for permitted system 424, PREF_ONLY field 436 for permitted system 426, and PREF_ONLY field 438 for permitted system 428.

Figure 6:
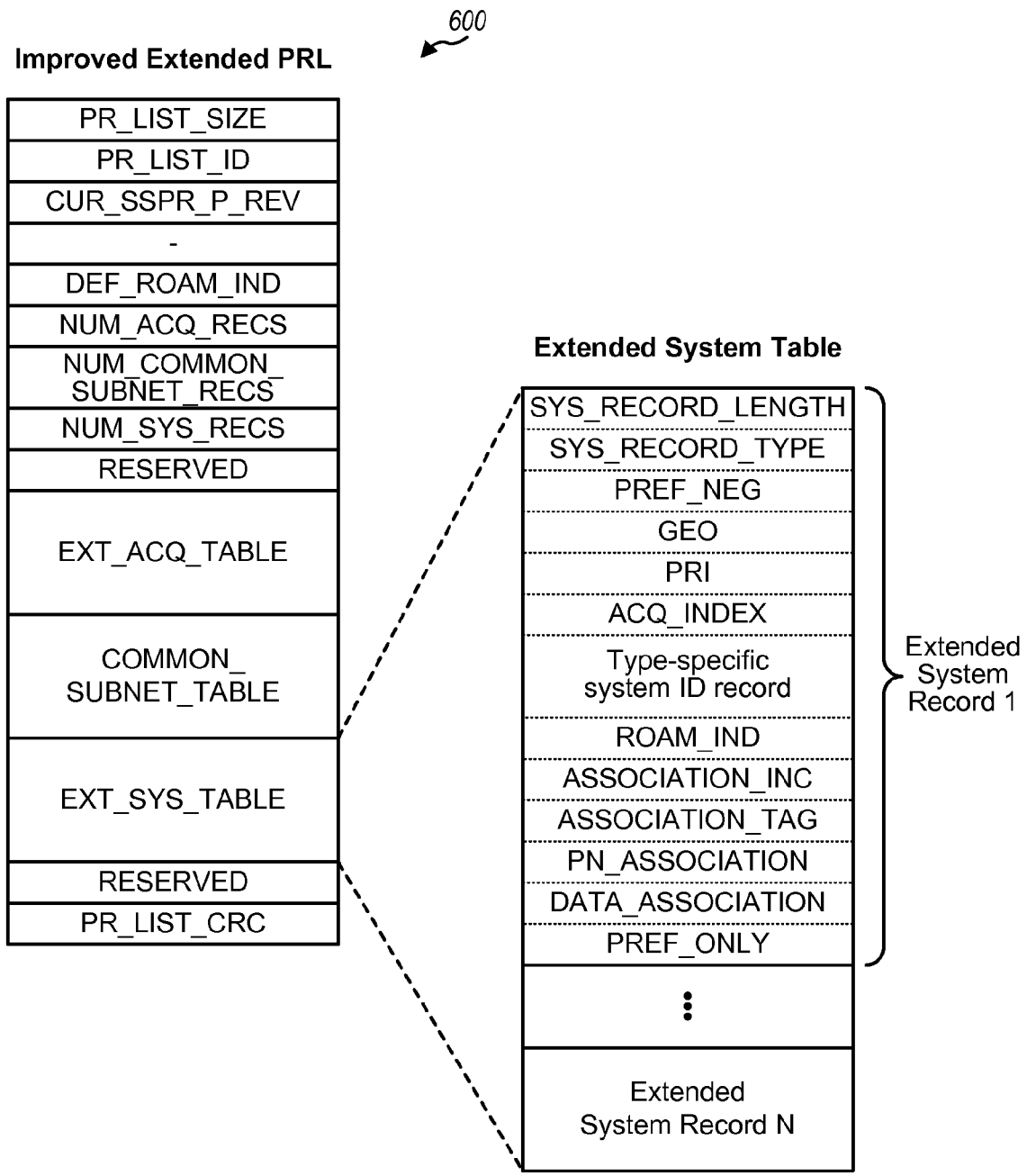
FIG. 6 shows an exemplary file containing an extended system selection file.

With reference to FIG. 6, there is provided a file 600 containing an extended system selection file that may be used for 1x and/or 1xEV-DO systems. The format of the extended system records are analogous to those of FIG. 1E, but additionally include a PREF_ONLY field that is specific to each listed system.

Figure 7:
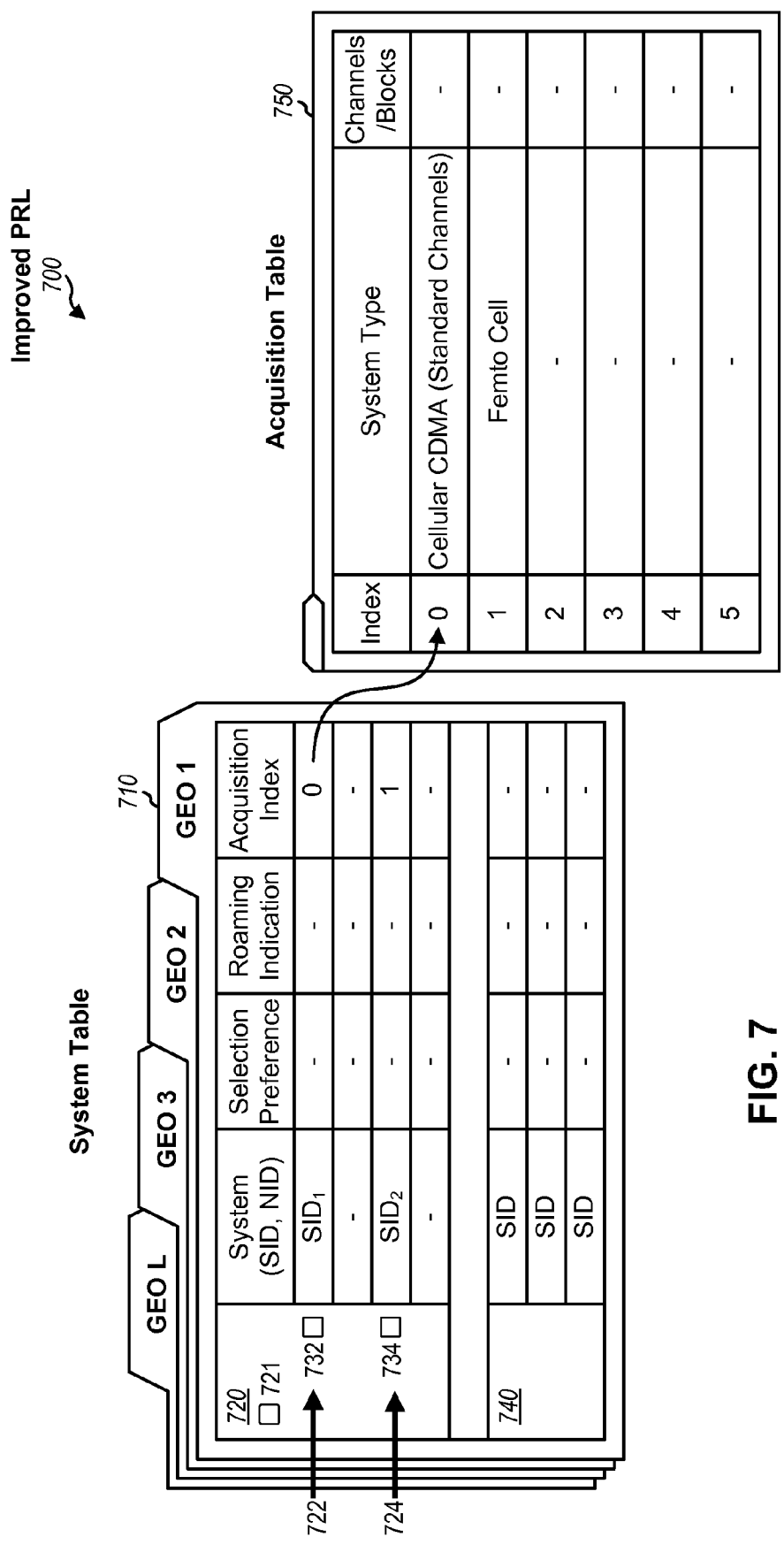
FIG. 7 illustrates another embodiment of a system selection file in accordance with aspects set forth herein.

FIG. 7 graphically shows another embodiment of a system selection file 700 that includes a system table 710 and an acquisition table 750. System table 710 of system selection file 700 may include permitted systems 722 and 724, each of which may be identified by a SID. For example, system 722 may be identified by $SID_1$, while system 724 may be identified by $SID_2$. In this example, the preferred systems are identified by the SID, regardless of what the NID is. In the alternative, or in addition, the permitted systems 722 and/or 724 may be identified by an MCC or the like. In the alternative, or in addition, the permitted systems 722 and/or 724 may be identified by a subnet-ID.

Each tabbed table may include a global flag 721 (e.g., PREF_ONLY) that applies to the entire PRL 700. System table 710 may include one or more local flags (e.g., PREF_ONLY) that apply to a subset of the systems/networks listed in system selection file 700. However, rather than having a PREF_ONLY field for each listed system/network, system table 710 includes a PREF_ONLY field 732 that applies to or is associated with system 722. System 710 may also include a PREF_ONLY field 734 that applies to or is associated with system 724. The components of system table 710 and acquisition table 750 are otherwise basically the same as system table 410 and acquisition table 450, respectively, of FIG. 4.

The effect of having PREF_ONLY field 732 apply only to system 722 is that, when this field is set to '1', then the AT with system selection file 700 operates only on those systems and networks identified by $SID_1$ with PREF_NEG set to '1', regardless of what the corresponding NID fields are set to. When PREF_ONLY field 732 is set to '0', then the AT operates on those systems and networks identified by $SID_1$ with PREF_NEG set to '1' or on systems/networks that are not specified in SYS_TABLE.

Similarly, the effect of having PREF_ONLY field 734 apply only to system 724 is that, when this field is set to '1', then the AT with system selection file 700 operates only on those systems and networks identified by $SID_2$ with PREF_NEG set to '1', regardless of what the corresponding NID fields are set to. When PREF_ONLY field 734 is set to '0', then the AT operates on those systems and networks identified by $SID_2$ with PREF_NEG set to '1' or on systems and networks that are not specified in SYS_TABLE.

In accordance with one or more aspects of the embodiments described herein, the system selection files and components thereof, shown in FIGS. 4-7, may be adapted for restricted or open association with AP base stations or femto cells. For example, in the context of one or more femto cells adapted for restricted association, a unique SID may be assigned for a femto network (i.e., a network of femto cells). In the alternative, or in addition, a unique NID may be assigned for each femto cell. A system selection file specific to a femto cell may be constructed such that (a) a SID/NID pair for the femto cell is the highest priority system in the femto cell GEO, and (b) a corresponding acquisition record points to the channel on which the femto cell operates. While in coverage of a macro network (i.e., a network of non-femto cells), a femto AT (FAT) (i.e., AT that is capable of being associated with an AP base station, based on software upgrades, through provisioning, etc.) may periodically search for the most referred system (i.e., the femto cell). On discovery of the femto cell, the FAT performs registration through the femto cell.

In the context of femto cells adapted for open association, either a unique SID/NID pair may be allocated for the femto network or a unique SID may be allocated for the femto network, wherein one or more femto cells in the femto network may be assigned separate NIDs. A system selection file specific to the femto network may be constructed such that (a) a SID/NID pair or SID for the femto network is the highest priority in the home GEO, and (b) a corresponding acquisition record points to the channel(s) on which the femto network operates. While in macro network coverage, a FAT may periodically search for a femto network. On discovery of any femto cell, the FAT may perform registration through the discovered femto cell.

The system selection files of FIGS. 4-7 may be provisioned or constructed for femto cells in a number of ways. In one embodiment, the owner of a femto cell may access a web page or other software with which he/she may set or receive a SID/NID pair for the femto cell, and enter information regarding which ATs are authorized to access the femto cell. The entered information may include identifiers, such as, for example, phone numbers, International Mobile Station Identities (IMSIs), or the like. Information regarding the SID/NID pair and authorized ATs may be received by a mobile operator core network, which in turn deploys updated system selection files to the authorized ATs. In the alternative, or in addition, the femto cell may deploy such updated system selection files to the authorized ATs.

For open association, all FATs may share a given system selection file, and existing provisioning mechanisms for PRLs, a public land mobile network (PLMNs) databases, and/or overlay algorithms/logic that sit above the 3GPP2-PRL and the 3GPP-PLMN based methods, may be adapted to support the provisioning of the system selection files described herein. For restricted association, each FAT may have a unique system selection file. Scalable mechanisms and solutions for restricted association may include (a) dynamic construction of a custom system selection file in the core network, and/or (b) system selection file provisioning using the femto cell.

In one exemplary approach to dynamic construction of the custom system selection file in the core network, there is provided a technique that involves using a subscriber identify to programmatically generate the NID. For example, a hash account ID, billing ID, or the like may be used to generate the NID. In the alternative, or in addition, the NID may be queried via the femto network Operations, Administration, and Maintenance (OA&M) function. The technique may involve coordinating with the femto cell and assigning it the generated the NID. In the alternative, or in addition, the femto cell may employ the same algorithm to generate the NID. The technique may involve constructing the custom system selection file on the fly, such that there is no need to store and manage subscriber specific system selection files. The technique may involve provisioning a FAT with the custom system selection file by performing Over-the-Air Parameter Administration (OTAPA), i.e., network initiated Over-the-Air Service Provisioning (OTASP) process of provisioning mobile station operational parameters over the air interface.

In one exemplary approach to system selection file provisioning using the femto cell, there is provided a technique that involves on, activation, provisioning a FAT with a bootstrap system selection file using OTAPA. The bootstrap system selection file may list a bootstrap NID as the highest priority system on a bootstrap channel. On first power up, the femto cell may enter bootstrap mode. In bootstrap mode, the femto cell may operate using the bootstrap NID on the bootstrap channel at very low power. It is noted that low power may help limit interference, and the user may place the FAT close to the femto cell. On subsequent AT registration, (a) the femto cell may construct the custom system selection file, wherein the custom system selection file lists the femto cell NID as the preferred system on its normal operation channel, and (b) the femto cell may re-provision the FAT using OTAPA. In the alternative, or in addition, the femto cell may perform bootstrap operation on user request.

The system selection file and associated techniques described herein enable reliable discovery of the femto cell when in femto cell coverage, and support both open and restricted associations. Further, the system selection file and described techniques leverage existing support in the AT and the core network, and have minimal impact on the performance of the AT in macro network coverage (i.e., no undue capture by alien femto cells and no system selection loops). This in contrast to techniques that rely on having each femto cell transmit a beacon to capture its home FAT (HFAT) (i.e., femto AT that is currently in the coverage of its associated femto cell), which may cause spectrum pollution, make femto cell detection unreliable, require tight femto-macro timing synchronization, and may result in potential loops (in the context of restricted association) when post redirection an AT is captured by a femto beacon again.

In accordance with one or more aspects of the embodiments of the system selection file and associated techniques described herein, there is provided a technique that utilizes Preferred User Zone Lists (PUZLs) for femto cells. It is noted that CDMA2000 1x Release 0 supports user zones, and that for femto cells, mobile specific user zones are of interest. The technique may involve supporting geo anchors (e.g., <SID, BASE_ID> and/or <SID, SECTOR_ID> and/or Subnet ID) in the zone description, and thereby remedy situations where the macro network may not include the correct Information Element (IE) in the System Parameter Message (SPM). When a FAT enters a coverage area of an overlapping macro base station, the FAT may start a focused search for its associated femto cell. The PUZL may be configured to enforce registration from the FAT on selection.

For open association, the PUZL may be useful for localizing the femto cell search. For example, the femto cell search may be localized within the coverage area of an overlapping macro base station. For restricted association, each femto cell may correspond to a unique zone within a reuse space (i.e., a frequency used by both a femto cell and a macro cell), and each FAT may be provisioned with a custom PUZL corresponding to the home femto cell zone. The femto cell may embed supported zones in an overhead message, but registration attempts cannot, in general, be restricted to zone subscribers. The femto cell may be adapted to filter registrations by alien ATs (AATs) (i.e., those ATs not authorized to operate on the femto cell), including an alien femto AT (AFAT) (i.e., femto AT that is in the coverage of an AP base station it is not authorized to operate on).

Although a standard, PUZL is not supported by some ATs, and may not prevent registration attempts by AATs. Still, the combination of the system selection file and the PUZL techniques described herein can help limit stray registration attempts. It is noted that the system selection file can include the femto cell, albeit not as the highest priority system, and may eliminate Better System Reselection (BSR). Accordingly, the PREF_ONLY flag may limit the registration attempt to a home femto cells only. It is further noted that the custom system selection file provisioning techniques described above, in the context of restricted association, are applicable for custom PUZL provisioning as well.

In accordance with one or more aspects of the embodiments described herein, there are provided methods for performing system selection and acquisition. With reference to the flow chart shown in FIG. 8A, there is provided a method 800 that may comprise receiving a system selection file that includes preference parameters and acquisition parameters for a plurality of communication systems (step 810). The communication systems include at least one AP base station or femto cell. For example, the systems may include one or more AP base stations for a femto network and one or more macro base stations for a macro network.

Figure 8A:
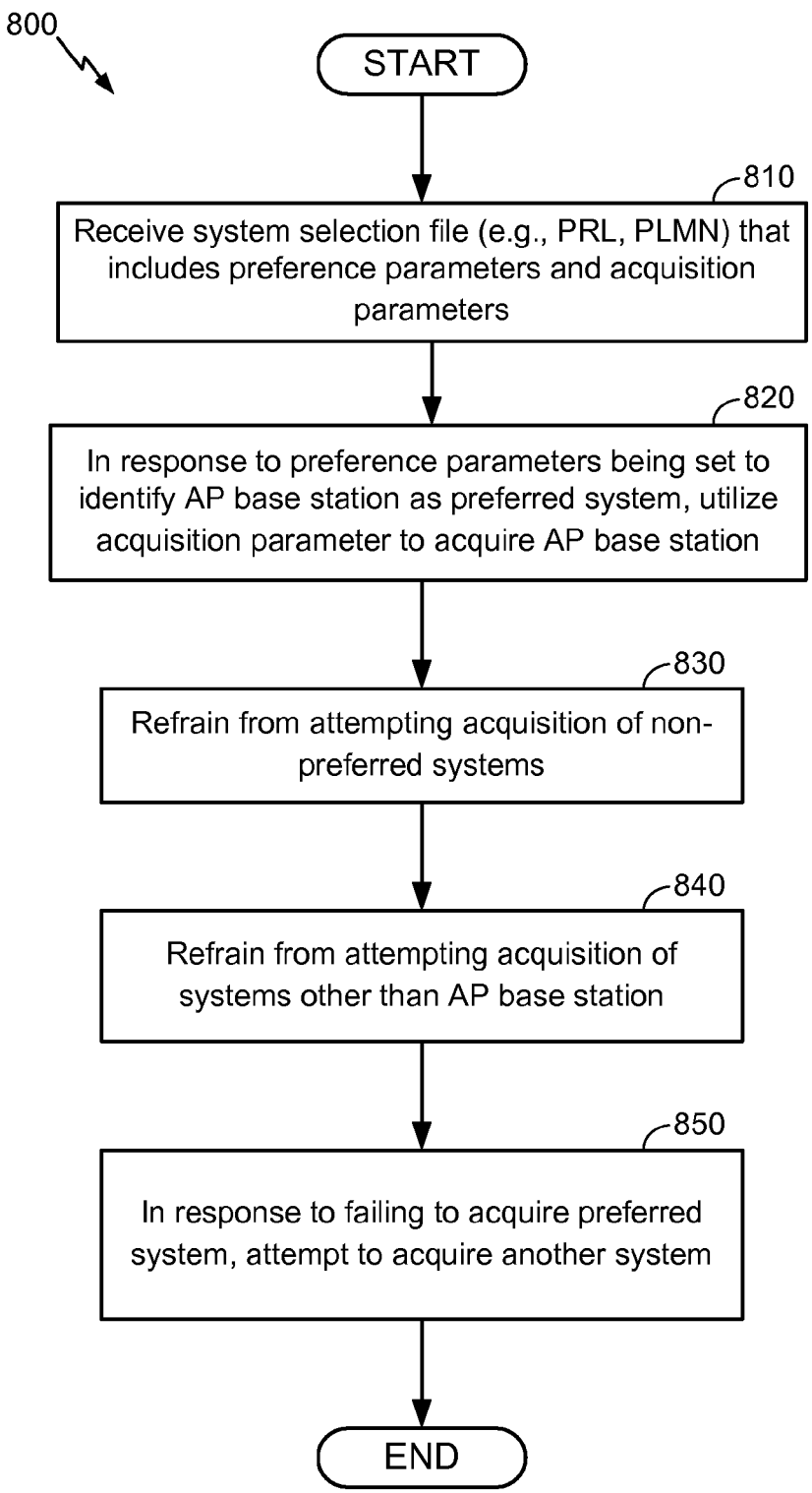
FIG. 8A shows one embodiment for a method for facilitation acquisition of one or more AP base stations.
Figure 8B:
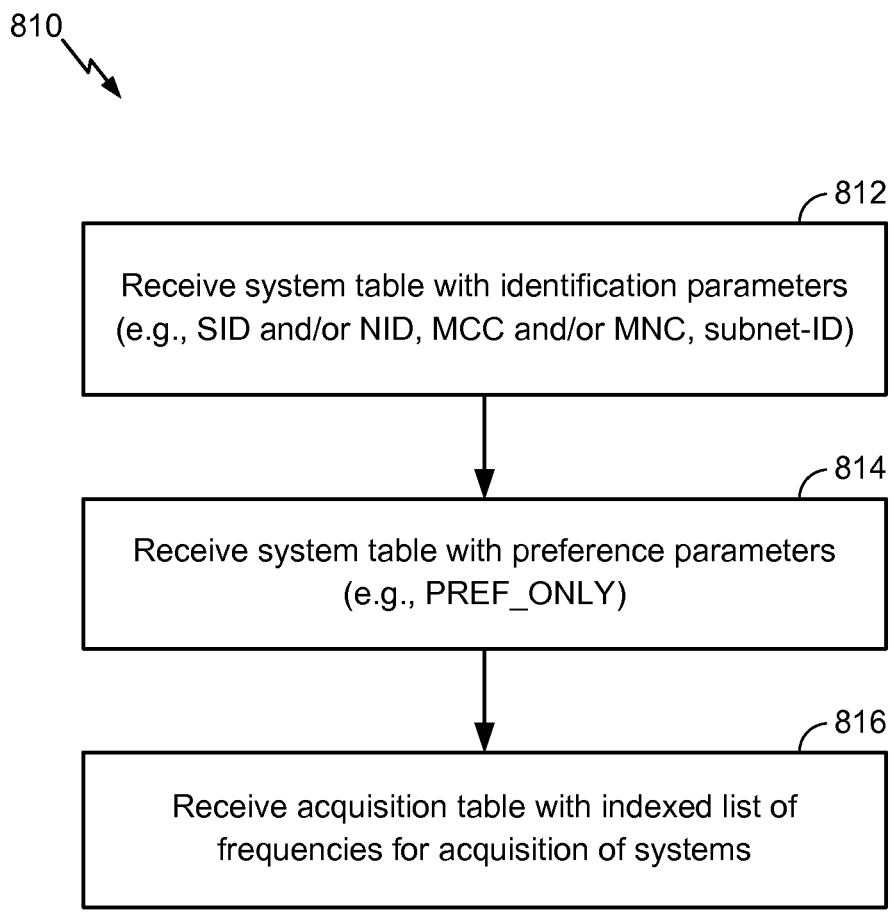
FIG. 8B shows several sample aspects of the method shown in FIG. 8A.

With reference to FIG. 8B, step 810 may involve receiving a system selection file with a system table having identification parameters for one or more of 3GPP2 1xRTT systems, wherein each identification parameter may include a SID and/or a NID (step 812). In the alternative or in addition, the identification parameters may include a MCC and/or a MNC for the 3GPP2 1xRTT systems. In the alternative or in addition, the system table may include identification parameters for one or more of 3GPP2 EV-DO systems, wherein each identification parameter may include a subnet-ID. Step 810 may involve receiving a system table that includes the preference parameters of the communication systems (step 814). The preference parameters may include PREF_ONLY fields for one or more of the communication systems. In related aspects, step 810 may involve receiving an acquisition table that includes an indexed list of frequencies for acquisition of the communication systems (step 816).

With reference once again to FIG. 8A, at step 820, in response to a given one of the preference parameters being set to identify the AP base station as a preferred system, the method may involve utilizing a corresponding acquisition parameter to attempt acquisition of the AP base station. Step 820 may involve or otherwise result in facilitating access to a femto cell and/or a macro cell. In related aspects, the method 800 may comprise refraining from attempting acquisition of non-preferred systems (step 830), and/or refraining from attempting acquisition of systems other than the AP base station (step 840). In further related aspects, the method 800 may comprise, in response to failing to acquire the preferred system, attempting to acquire another preferred system or optionally a non-preferred system (step 850).

Figure 9A:
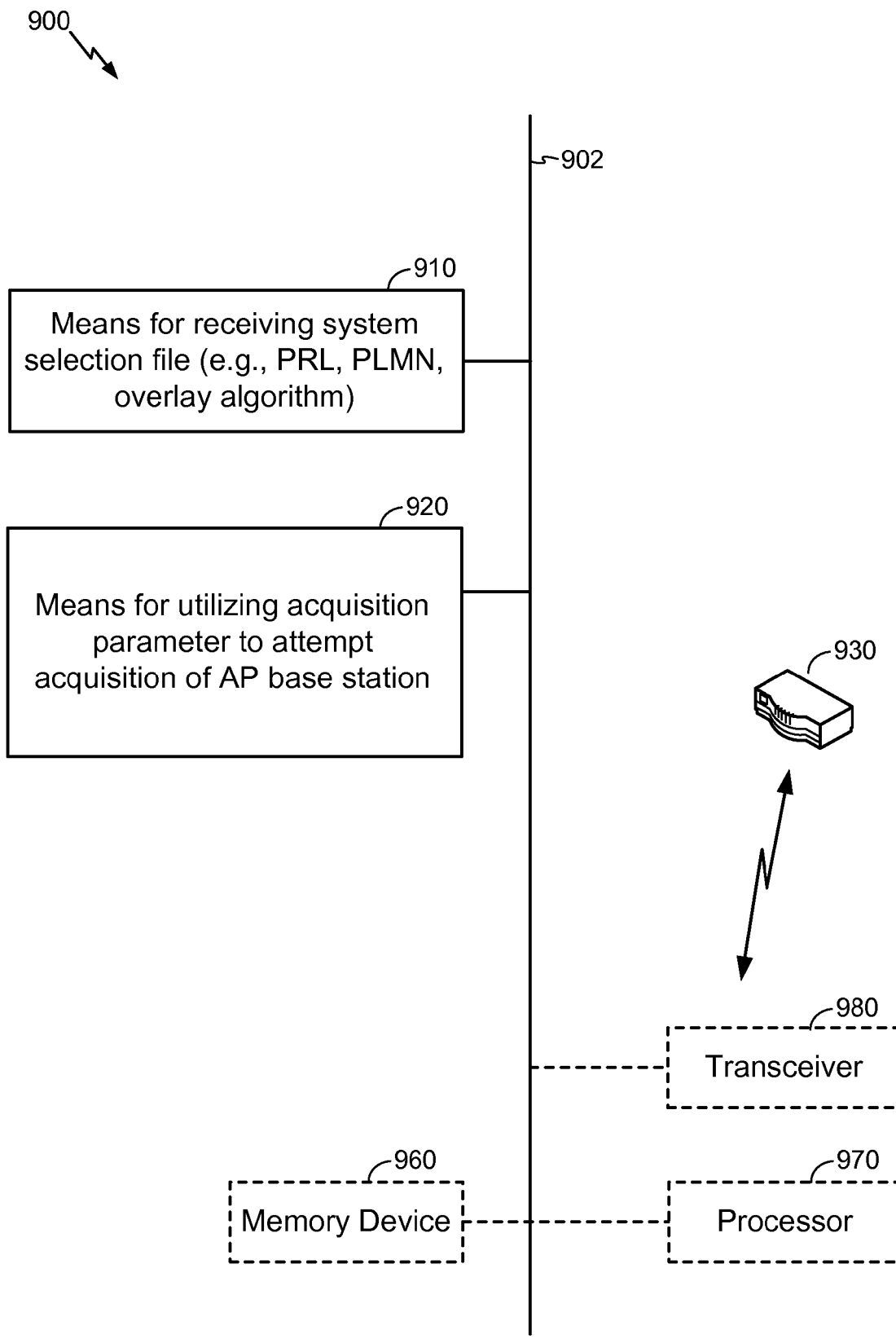
FIG. 9A illustrates one embodiment of an apparatus for facilitating acquisition of one or more AP base stations.
Figure 9B:
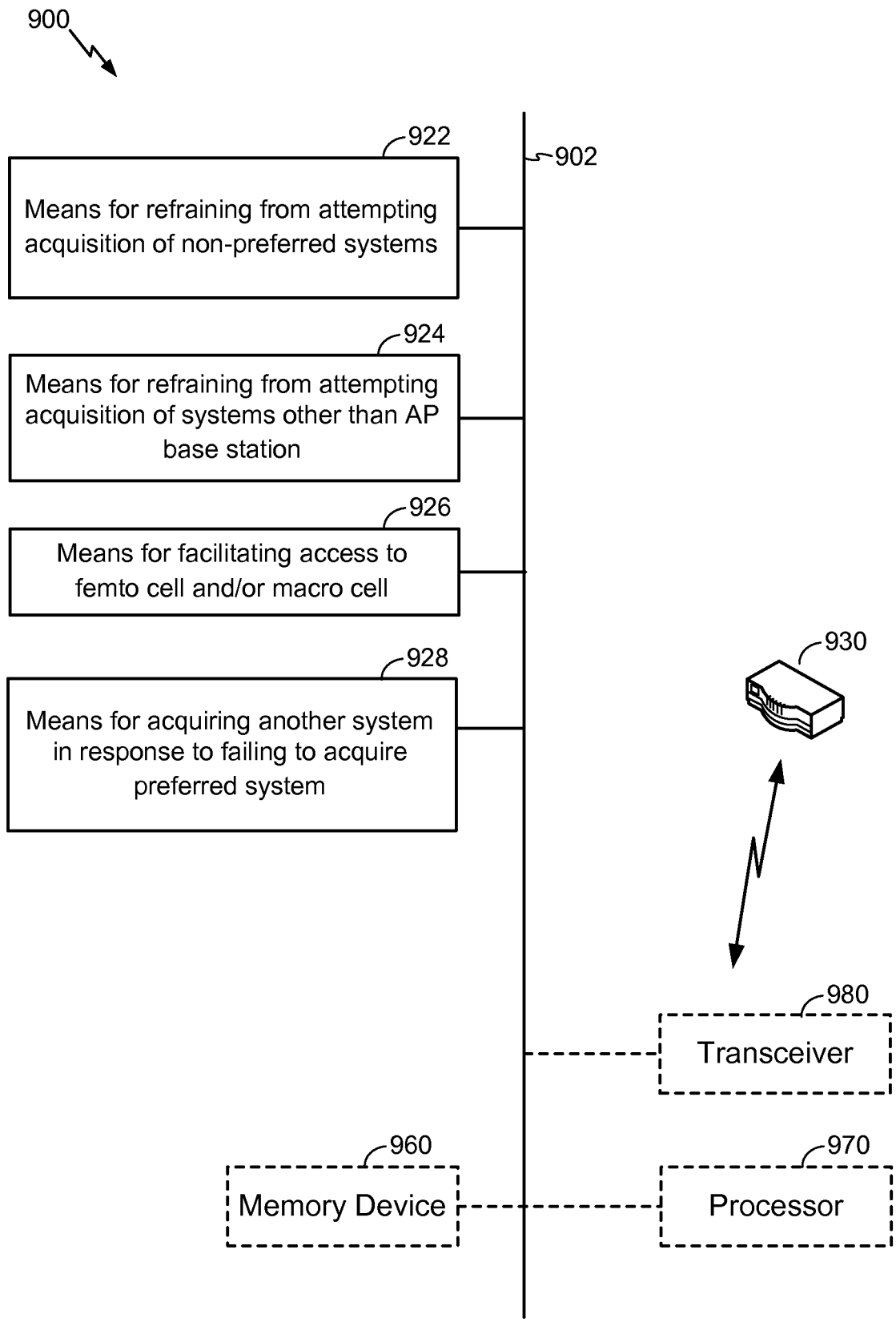
FIG. 9B shows several sample aspects of the apparatus shown in FIG. 9A.

In accordance with one or more aspects of the embodiments described herein, there are provided devices and apparatuses for system selection and acquisition. With reference to FIG. 9, there is provided an exemplary apparatus 900 that may be configured as either a communication terminal or device, or as a processor or similar device for use within a communication terminal or device, such as, for example, an AT or the like. As illustrated, apparatus 900 comprises a means 910 for receiving a system selection file. The system selection file may include preference parameters and acquisition parameters for a plurality of communication systems. The communication systems include at least one AP base station 930 or femto cell. For example, the systems may include one or more AP base stations for a femto network and one or more macro base stations for a macro network.

The system selection file may include a system table, which in turn may include identification parameters of the systems In one embodiment, the identification parameters may include one or more SIDs and/or one or more NIDs. In another embodiment, the identification parameters may include one or more MCCs and/or one or more MNCs. In yet another embodiment, the identification parameters may include one or more subnet-IDs.

In related aspects, each system table entry is keyed by a SID/NID pair, a MCC/MNC pair, or a subnet-ID. In further related aspects, the system table may include the preference parameters for the systems. Each preference parameter may include a PREF_ONLY field for a given one of the systems. It is noted that at least one of the preference parameters may include a PREF_ONLY field or the like for a subset of the systems. The system selection file may include an acquisition table, which in turn may include an indexed list of frequencies for acquisition of the systems. Each system table entry may include an acquisition index that refers to at least one the frequencies listed in the acquisition table.

The apparatus 900 may comprise a means 920 for utilizing, in response to a given one of the preference parameters being set to identify the AP base station 930 as a preferred system, a corresponding acquisition parameter to attempt acquisition of the AP base station 930. In related aspects, the means 920 for utilizing may be adapted for or comprise a means 922 for refraining from attempting acquisition of non-preferred systems. In the alternative, or in addition, the means 920 may be adapted for or comprise a means 924 for refraining from attempting acquisition of systems other than the AP base station 930. In further related aspects, the means 920 be adapted for or comprise a means 926 for facilitating access to a femto cell and/or a macro cell. In still further related aspects, the means 920 be adapted for or comprise a means 928 for acquiring another preferred system and/or optionally a non-preferred system in response to failing to acquire the preferred system.

Apparatus 900 may optionally include a processor 970 in the case of an apparatus 900 configured as a communication terminal, rather than as a processor. Processor 970, in such case, may be in operative communication with means 910 and 920 via a bus 902 or similar communication coupling. Processor 970 may effect initiation and scheduling of the processes or functions performed by means 910 and 920, and components thereof.

It is noted that the apparatus 900 may optionally include a means for storing the system selection file, such as, for example, a memory device/module 960. Computer readable medium or memory device/module 960 may be operatively coupled to the other components of apparatus 900 via bus 902 or the like. The computer readable medium or memory device 960 may be adapted to store computer readable instructions and data for effecting the processes and behavior of either means 910 and 920, and components thereof, or processor 950 (in the case of apparatus 900 configured as a terminal) or the methods disclosed herein. The apparatus 900 may also include a transceiver 980 operatively coupled to the other components of the apparatus 900. A stand alone receiver and/or stand alone transmitter may be used in lieu of or in conjunction with the transceiver 980.

Figure 10:
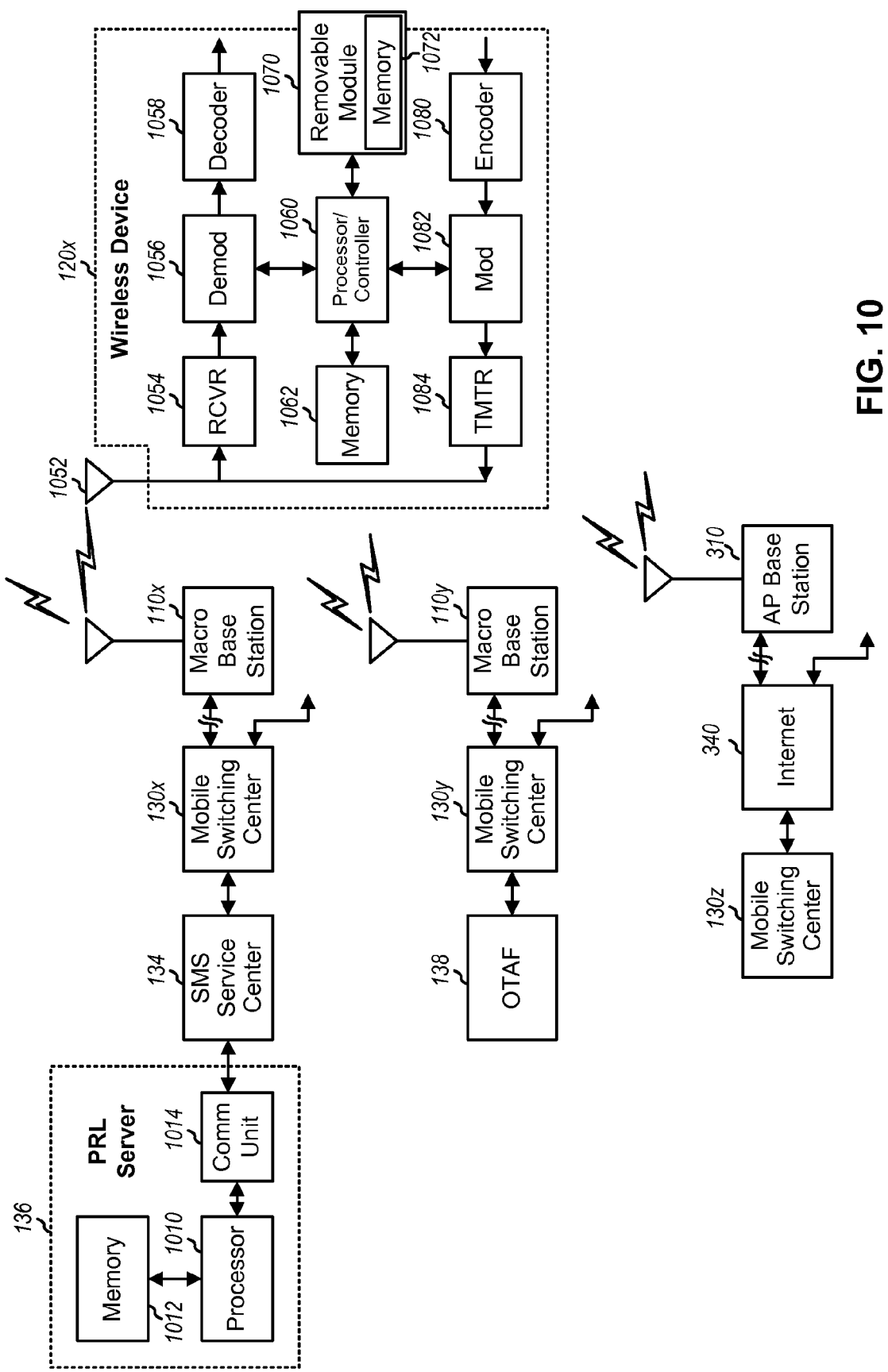

FIG. 10 shows a block diagram of an embodiment of wireless device 120x and various network entities. At wireless device 120x, an antenna 1052 receives signals transmitted by various macro base stations (e.g., macro base stations 110x and/or 110y) and/or AP base station(s) (e.g., AP base station 310), and provides a received signal. A receiver unit (RCVR) 1054 conditions (e.g., filters, amplifies, and frequency downconverts) the received signal, digitizes the conditioned signal, and provides data samples. A demodulator (Demod) 1056 demodulates the data samples and provides demodulated data. A decoder 1058 decodes the demodulated data and provides decoded data. The demodulation and decoding may be based on, e.g., 1x or 1xEV-DO physical layer processing. For data transmission, an encoder 1080 encodes data and messages to be transmitted by wireless device 120x, and a modulator (Mod) 1082 modulates the encoded data. A transmitter unit (TMTR) 1084 conditions (e.g., filters, amplifies, and frequency upconverts) the modulated data and generates a modulated signal, which is transmitted via antenna 1052.

A processor/controller 1060 may direct the operation of various processing units within wireless device 120x. Controller 1060 may further perform process 800 in FIG. 8 to obtain and use the system selection files of FIGS. 4-7 for use by wireless device 120x for system selection and acquisition. Memory unit 1062 stores program codes and data used by controller 1060. A removable module 1070 includes a non-volatile memory unit 1072 that can store various types of data. For example, removable module 1070 may store an elementary file comprising a system selection file having the structure described above, subscription information for a user, and so on. Removable module 1070 makes it easier for the user to roam among CDMA networks, and between networks of different RATs, and also allows the user to use the same removable module on different wireless devices. Removable module 1070 may be an R-UIM (used for cdma2000), a Subscriber Identity Module (SIM) (used for W-CDMA and GSM), a Universal Subscriber Identity Module (USIM) (also used for W-CDMA and GSM), and so on.

A system selection file server 136 supports over-the-air programming of system selection files using SMS messages. Within system selection file server 136, a processor 1010 receives multiple PRLs from a memory unit 1012 and generates a data block with these PRLs. A communication unit 1014 forwards the data block to an SMS service center 134, which encapsulates the data block within one or more SMS messages. An MSC 130x receives the SMS messages and forwards the messages via a base station controller (BSC) (not shown in FIG. 10) to base station 110x, which then transmits the messages over-the-air to the wireless devices within its coverage area.

An Over-the-Air Service Provisioning Function (OTAF) 138 also supports over-the-air programming of PRL. OTAF 138 may generate a data block with multiple PRLs and encapsulates the data block in one or more messages. An MSC 130y receives the message(s) from OTAF 138 and forwards the message(s) via a BSC (not shown in FIG. 10) to base station 110y for transmission to the wireless devices. At wireless device 120x, controller 1060 receives a decoded data block with one or more PRLs and stores the PRL information, e.g., as an EF.sub.PRL elementary file in removable module 1070. The concatenated PRL may also be stored in a non-volatile memory at wireless device 120x.

An AP base station 310 is in operative communication with the Internet 340 and the macro network via a DSL router, a cable modem, or the like. The Internet 340 provides a broadband backhaul link to the MSC 130z or the like of the macro network.

While this application describes particular examples of the present invention, those of ordinary skill can devise variations of the present invention without departing from the inventive concept. For example, the teachings herein refer to circuit-switched network elements but are equally applicable to packet-switched domain network elements. It is noted that the word "exemplary" is used herein to mean "serving as an example, instance, or illustration." Any embodiment described herein as "exemplary" is not necessarily to be construed as preferred or advantageous over other embodiments.

It will be appreciated that, in accordance with one or more aspects described herein, inferences can be made regarding determining communication parameters for a plurality of surrounding femto cells and/or macro cells as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure The accompanying method claims present elements of the various steps in sample order, and are not meant to be limited to the specific order or hierarchy presented.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Furthermore, various embodiments are described herein in connection with a mobile device. A mobile device can also be called a system, subscriber unit, subscriber station, mobile station, mobile, remote station, remote terminal, Access Terminal (AT), user terminal, terminal, wireless communication device, user agent, user device, or User Equipment (UE). A mobile device can be a cellular telephone, a cordless telephone, a Session Initiation Protocol (SIP) phone, a Wireless Local Loop (WLL) station, a Personal Digital Assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as Code Division Multiple Access (CDMA), Multiple-Carrier CDMA (MC-CDMA), Wideband CDMA (W-CDMA), High-Speed Packet Access (HSPA, HSPA+), Time Division Multiple Access (TDMA), Frequency Division Multiple Access (FDMA), Orthogonal Frequency Division Multiple Access (OFDMA), Single Carrier Frequency Domain Multiplexing (SC-FDMA) and other multiple access systems/techniques. The terms "system" and "network" may be used interchangeably. A CDMA system may implement a radio technology such as Universal Terrestrial Radio Access (UTRA), CDMA2000, etc. UTRA may include W-CDMA and/or other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). It is further noted that the wireless communication system described herein may implement one or more standards, such as, for example, IS-95, cdma2000, IS-856, W-CDMA, TD-SCDMA, etc.

The various illustrative logical blocks, modules, and circuits described in connection with the examples disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in Random Access Memory (RAM), flash memory, Read-Only Memory (ROM), EPROM, Electrically Erasable Programmable Read-Only Memory (EEPROM), registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. if implemented in software, the functions may be stored on or transmitted over as one or more instructions or code on a non-transitory computer-readable medium. Non-transitory computer-readable media includes both computer storage media and communication media including any medium that facilitates transfer of a computer program from one place to another, A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method of performing system selection and acquisition in a communication device, comprising:
   receiving a system selection file from a network entity, the file comprising preference parameters and acquisition parameters for a plurality of communication systems, the systems further comprising at least one femto base station, wherein each of the preference parameters comprises a local flag for a given one or a subset of the plurality of communication systems, wherein the local flag is set to indicate that the communication device operates only on the subset of the plurality of communication systems which are specified in the system selection file as being systems on which the communication device is allowed to operate; and
   in response to a given one of the preference parameters being set to identify a femto base station as a preferred system, utilizing a corresponding acquisition parameter to attempt acquisition of the femto base station.

2. The method of claim 1, further comprising refraining from attempting acquisition of non-preferred systems.

3. The method of claim 1, further comprising refraining from attempting acquisition of systems other than the femto base station.

4. The method of claim 1, further comprising, in response to failing to acquire the preferred system, attempting to acquire another preferred system.

5. The method of claim 1, wherein receiving the file comprises receiving at least one of a preferred roaming list (PRL), a public land mobile network (PLMN) database, and an overlay algorithm configured to select at least one of a PRL and a PLMN database.

6. The method of claim 5, wherein receiving the file comprises receiving a system table that includes identification parameters of the systems, each identification parameter comprising at least one of a system identifier (SID) and a network identifier (NID) for a given one of the systems.

7. The method of claim 5, wherein receiving the file comprises receiving a system table that includes identification parameters of the systems, each identification parameter comprising at least one of a Mobile Country Code (MCC) and a Mobile Network Code (MNC) for a given one of the systems.

8. The method of claim 5, wherein receiving the file comprises receiving a system table that includes identification parameters of the systems, each identification parameter comprising a subnet-ID for a given one of the systems.

9. The method of claim 5, wherein receiving the file comprises receiving a system table that includes the preference parameters of the systems, each preference parameter comprising a PREF_ONLY field for a given one of the systems.

10. The method of claim 5, wherein receiving the file comprises receiving an acquisition table that includes an indexed list of frequencies for acquisition of the systems.

11. A communication device, comprising:
    a receiver adapted to receive a system selection file from a network entity, the file comprising preference parameters and acquisition parameters for a plurality of communication systems, the systems further comprising at least one femto base station, wherein each of the preference parameters comprises a local flag for a given one or a subset of the plurality of communication systems, wherein the local flag is set to indicate that the communication device operates only on the subset of the plurality of communication systems which are specified in the system selection file as being systems on which the communication device is allowed to operate; and
    at least one processor adapted to, in response to a given one of the preference parameters being set to identify a femto base station as a preferred system, utilize a corresponding acquisition parameter to attempt acquisition of the femto base station.

12. The device of claim 11, wherein the at least one processor is adapted to refrain from attempting acquisition of non-preferred systems.

13. The device of claim 11, wherein the at least one processor is adapted to refrain from attempting acquisition of systems other than the femto base station.

14. The device of claim 11, wherein the at least one processor is adapted to facilitate access to a femto cell.

15. The device of claim 11, wherein the at least one processor is adapted to, in response to failing to acquire the preferred system, attempts to acquire another preferred system.

16. The device of claim 11, wherein the file comprises at least one of a preferred roaming list (PRL), a public land mobile network (PLMN) database, and an overlay algorithm configured to select at least one of a PRL and a PLMN database.

17. The device of claim 16, wherein the file comprises a system table that includes identification parameters of the systems.

18. The device of claim 17, wherein the identification parameters comprise at least one of a system identifier (SID) and a network identifier (NID) for a given one of the systems.

19. The device of claim 17, wherein the identification parameters comprise at least one of a Mobile Country Code (MCC) and a Mobile Network Code (MNC) for a given one of the systems.

20. The device of claim 17, wherein the identification parameters comprise subnet-ID for a given one of the systems.

21. The device of claim 17, wherein the system table comprises the preference parameters for the systems.

22. The device of claim 21, wherein each preference parameter comprises a PREF_ONLY field for a given one of the systems.

23. The device of claim 21, wherein at least one of the preference parameters comprises a PREF_ONLY field for a subset of the systems.

24. The device of claim 17, wherein the file further comprises an acquisition table, the acquisition table comprising an indexed list of frequencies for acquisition of the systems.

25. The device of claim 24, wherein each system table entry comprises an acquisition index that refers to at least one the frequencies listed in the acquisition table.

26. The device of claim 11, further comprising a memory unit in operative communication with the receiver and the at least one processor, the memory unit being adapted to store the file.

27. An apparatus, comprising:
means for receiving a file from a network entity, the file comprising preference parameters and acquisition parameters for a plurality of communication systems, the systems further comprising at least one femto base station, wherein each of the preference parameters comprises a local flag for a given one or a subset of the plurality of communication systems, wherein the local flag is set to indicate that a communication device operates only on the subset of the plurality of communication systems which are specified in the file as being systems on which the communication device is allowed to operate; and
means for utilizing, in response to a given one of the preference parameters being set to identify a femto base station as a preferred system, a corresponding acquisition parameter to attempt acquisition of the femto base station.

28. The apparatus of claim 27, wherein the means for utilizing comprises means for refraining from attempting acquisition of non-preferred systems.

29. The apparatus of claim 27, wherein the means for utilizing comprises means for refraining from attempting acquisition of systems other than the femto base station.

30. The apparatus of claim 27, further comprising means for acquiring another preferred system in response to failing to acquire the preferred system.

31. The apparatus of claim 27, wherein the file comprises at least one of a preferred roaming list (PRL), a public land mobile network (PLMN) database, and an overlay algorithm configured to select at least one of a PRL and a PLMN database.

32. The apparatus of claim 31, wherein the file comprises a system table that includes identification parameters of the systems.

33. The apparatus of claim 32, wherein the identification parameters comprise at least one of a system identifier (SID) and a network identifier (NID) for a given one of the systems.

34. The apparatus of claim 32, wherein the identification parameters comprise at least one of a Mobile Country Code (MCC) and a Mobile Network Code (MNC) for a given one of the systems.

35. The apparatus of claim 32, wherein the identification parameters comprise subnet-ID for a given one of the systems.

36. The apparatus of claim 32, wherein the system table comprises the preference parameters for the systems.

37. The apparatus of claim 36, wherein each preference parameter comprises a PREF_ONLY field for a given one of the systems.

38. The apparatus of claim 36, wherein at least one of the preference parameters comprises a PREF_ONLY field for a subset of the systems.

39. The apparatus of claim 32, wherein the file further comprises an acquisition table, the acquisition table comprising an indexed list of frequencies for acquisition of the systems.

40. The apparatus of claim 39, wherein each system table entry comprises an acquisition index that refers to at least one the frequencies listed in the acquisition table.

41. The apparatus of claim 27, further comprising means for storing the file.

42. A computer program product, comprising:
a non-transitory computer-readable medium comprising:
code for causing a computer to receive a system selection file from a network entity, the file comprising preference parameters and acquisition parameters for a plurality of communication systems, the systems further comprising at least one femto base station, wherein each of the preference parameters comprises a local flag for a given one or a subset of the plurality of communication systems, wherein the local flag is set to indicate that a communication device operates only on the subset of the plurality of communication systems which are specified in the system selection file as being systems on which the communication device is allowed to operate; and
code for causing the computer to, in response to a given one of the preference parameters being set to identify a femto base station as a preferred system, utilizing a corresponding acquisition parameter to attempt acquisition of the femto base station.

43. The computer program product of claim 42, wherein the file comprises at least one of a preferred roaming list (PRL), a public land mobile network (PLMN) database, and an overlay algorithm configured to select at least one of a PRL and a PLMN database.

44. The computer program product of claim 43, wherein the file comprises a system table that includes identification parameters of the systems.

45. The computer program product of claim 44, wherein the identification parameters comprise at least one of a system identifier (SID) and a network identifier (NID) for a given one of the systems.

46. The computer program product of claim 44, wherein the identification parameters comprise at least one of a Mobile Country Code (MCC) and a Mobile Network Code (MNC) for a given one of the systems.

47. The computer program product of claim 44, wherein the identification parameters comprise subnet-ID for a given one of the systems.

48. The computer program product of claim 44, wherein the system table that includes the preference parameters for the systems.

49. The computer program product of claim 48, wherein each preference parameter comprises a PREF_ONLY field for a given one of the systems.

50. The computer program product of claim 48, wherein at least one of the preference parameters comprises a PREF_ONLY field for a subset of the systems.

51. The computer program product of claim 44, wherein the file further comprises an acquisition table, the acquisition table comprising an indexed list of frequencies for acquisition of the systems.

52. The computer program product of claim 51, wherein each system table entry comprises an acquisition index that refers to at least one the frequencies listed in the acquisition table.

53. The method of claim 1, wherein:
the subset comprises a femto cell corresponding to the femto base station; and
the file further comprises a global flag that applies to all permitted systems listed in the file.

* * * * *